United States Patent [19]
Naito et al.

[11] Patent Number: 5,841,946
[45] Date of Patent: Nov. 24, 1998

[54] CHAOTIC CHARACTER EVALUATING APPARATUS AND METHOD OF THE SAME AND PROCESSING APPARATUS OF RESULTING THE CHAOTIC CHARACTER EVALUATION

[75] Inventors: Masayoshi Naito, Kawagoe; Naoki Tanaka, Tokyo; Hiroshi Okamoto, Ome; Masahiro Kayama; Yasuo Morooka, both of Hitachi, all of Japan

[73] Assignee: Hitachi, Ltd., Tokyo, Japan

[21] Appl. No.: 348,109

[22] Filed: Nov. 25, 1994

[30] Foreign Application Priority Data

Nov. 26, 1993 [JP] Japan ..................... 5-296923
Aug. 26, 1994 [JP] Japan ..................... 6-201766

[51] Int. Cl.$^6$ ..................................................... G06F 15/18
[52] U.S. Cl. ............................................... 395/10; 395/11
[58] Field of Search ........................... 395/10–11, 50–51, 395/60–62, 800; 364/553

[56] References Cited

U.S. PATENT DOCUMENTS 5,493,516  2/1996  Broomhead et al. ................ 364/553
5,506,996  4/1996  Wang et al. ........................ 395/800

OTHER PUBLICATIONS

Physical Review Letters, 50(1983), pp. 346–349.
Physics Letters, 111A(1985), pp. 152–156.
Nature, 358(1992), pp. 217–220.
Electronics, 1993, Feb. pp. 72–76.
Physica D, 35(1989), pp. 357–381.
Physics Letters A, 155(1991), pp. 480–493.
Rev. Modern Physics 65(1993), pp. 1344–1346.
Phys. Rev. Lett., 55, pp. 1082–1085(1985).

*Primary Examiner*—Tariq R. Hafiz
*Attorney, Agent, or Firm*—Antonelli, Terry, Stout & Kraus, LLP

[57] ABSTRACT

A chaotic character evaluating apparatus includes a processor for predicting future variation in sequential data and a processing for determining a degree of accuracy of the prediction, a processor for predicting variation of the sequential data in reverse and a processor for determining a degree of accuracy of the prediction, and a processing for comparing the degrees of accuracy with each other. If the degrees of the accuracy differ from each other, the variation of the sequential data is determined to be attributable to chaos, while when the degrees of accuracy are substantially equal to each other, the variation in the sequential data is determined to be attributable to noise. Further, a control apparatus for generating a control value from a feedback signal output from an object under control and having chaotic components eliminated is realized. Thus, it is possible to easily and accurately determine whether variation in the sequential data is attributable to chaos or noise.

30 Claims, 35 Drawing Sheets

FIG. 4

| TIME SERIAL NUMBER | SIGNAL VALUE | | | | |
|---|---|---|---|---|---|
| | $X_t(1)$ | $X_t(2)$ | $X_t(3)$ | ............... | $X_t(m)$ |
| $X_N$ | 0.2234 | 0.2457 | 0.2681 | ............... | 0.3781 |
| $X_{N-1}$ | 0.2457 | 0.2681 | 0.3781 | ............... | 0.4135 |
| ⋮ | ⋮ | ⋮ | ⋮ | | ⋮ |
| $X_t$ | 0.3781 | 0.4135 | 0.4523 | ............... | 0.4921 |
| ⋮ | ⋮ | ⋮ | ⋮ | | ⋮ |
| $X_n$ | 0.4135 | 0.4523 | 0.4921 | ............... | 0.5410 |

| DATA ID NUMBER i | PREDICTED VALUE AND MEASURED VALUE | | | | |
|---|---|---|---|---|---|
| | $\eta(i, 1)$ | $\xi(i, 1)$ | $\eta(i, 2)$ | $\xi(i, 2)$ | ......... |
| 1 | 0.3592 | 0.3546 | 0.3863 | 0.3786 | ......... |
| 2 | 0.7358 | 0.7264 | 0.6954 | 0.7041 | ......... |
| ⋮ | ⋮ | ⋮ | ⋮ | ⋮ | ......... |
| Q | 0.4265 | 0.4230 | 0.4471 | 0.4413 | ......... |

105

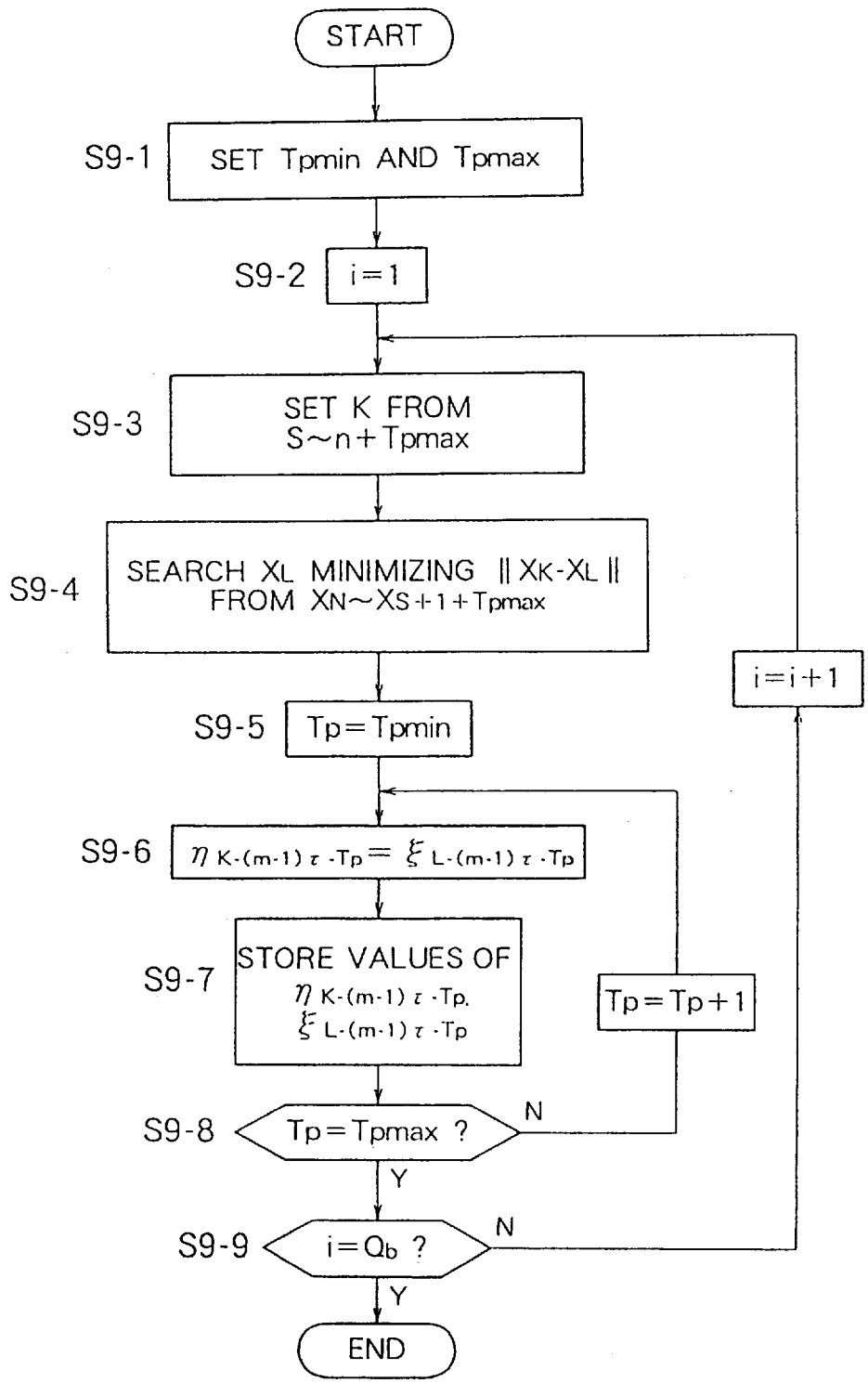

FIG. 15

| ID NUMBER | EMBEDDING SIGNALS AT TIME POINT t1 | | | | | EMBEDDING SIGNALS AT TIME POINT t2 | | | | |
|---|---|---|---|---|---|---|---|---|---|---|
| | $X_{t1}$ | $X_{t1-\tau}$ | $X_{t1-2\tau}$ | ...... | $X_{t1-(m-1)\tau}$ | $X_{t2}$ | $X_{t2-\tau}$ | $X_{t2-2\tau}$ | ...... | $X_{t2-(m-1)\tau}$ |
| 1 | 0.2234 | 0.2457 | 0.2681 | ...... | 0.3781 | 0.2457 | 0.2681 | 0.3259 | ...... | 0.4001 |
| 2 | 0.2457 | 0.2681 | 0.3624 | ...... | 0.4135 | 0.2681 | 0.3624 | 0.4021 | ...... | 0.4521 |
| 3 | 0.2681 | 0.3781 | 0.4024 | ...... | 0.4523 | 0.3781 | 0.4024 | 0.4521 | ...... | 0.4920 |
| 4 | 0.3781 | 0.4135 | 0.4410 | ...... | 0.4921 | 0.4135 | 0.4410 | 0.4877 | ...... | 0.5210 |
| 5 | 0.4135 | 0.4523 | 0.4752 | ...... | 0.5410 | 0.4523 | 0.4752 | 0.5329 | ...... | 0.5749 |
| ...... | | | | | | | | | | |

1405

EXAMPLE OF DISPLAY GENERATED
WHEN CHAOS IS PRESENT

EXAMPLE OF DISPLAY GENERATED
WHEN CHAOS IS ABSENT

CHAOTIC CHARACTER EVALUATING APPARATUS AND METHOD OF THE SAME AND PROCESSING APPARATUS OF RESULTING THE CHAOTIC CHARACTER EVALUATION

BACKGROUND OF THE INVENTION

The present invention relates to a processing of sequential data arranged in an orderly manner so that the data can be handled as time series data. For instance, the invention is directed to a method of evaluating or deciding chaotic character of time series data undergoing variations in an apparatus in which chaos is made use of or an apparatus for performing control, prediction and the like with high accuracy by positively and precisely eliminating any chaotic disturbance or a data analyzing apparatus as well as an apparatus and a method for deciding whether variation of data is attributable to chaos having deterministic characteristics.

Further, the present invention is concerned with implementation of an apparatus for performing control, evaluation of state, predictions and the like with high accuracy by positively eliminating chaos from an object of concern on which the chaos is superposed as a disturbance. Furthermore, the present invention is concerned with an apparatus suited advantageously for control, state evaluation and prediction concerning an object for which the degree of chaotic behavior exhibited by a signal representing changes or variations in the state of the object as detected time-serially is not uniform.

When variation in the time series data is attributable to chaos rather than noise, the data which appears to vary irregularly at a glance does behave in conformance with deterministic rules in the background. Under the circumstances, in the industrial apparatuses in which time series data are processed for utilization, the capability of determining whether variation of data is brought about by chaos or by noise is very important, because when the variation is of chaotic nature, data processing can be performed by taking advantage of the characteristic behavior of the chaos, while when the variation is attributable to noise, processing for coping with the noise can be adopted, i.e., because the processings appropriate to the characteristics of the data can be selected.

As a method of determining or evaluating the chaotic nature or chaotic character of data, there has heretofore been adopted a method of determining a correlation dimension of an attractor representing a feature of motion of a system, the attractor being constructed on the basis of time series data. The correlation dimension can be determined by a method described in, for instance, "Physical Review Letters", 50 (1983), pp. 346–349. In an approach for the reconstruction of the attractor from the time series data, a procedure referred to as the embedding is resorted to. In the analysis of the chaotic character, the correlation dimension of a geometry obtained as a result of the embedding is calculated by incrementing the embedding dimension during the embedding processing.

As is described in "Physics Letters", 111A (1985), pp. 152–156, when the correlation dimension is saturated to a constant value, this indicates the existence or presence of an attractor in a system of concern and hence the presence of dynamics or regularities, characterizing thus the variation as being deterministic. In that case, unless the correlation dimension can be given in terms of an integer, it is then decided that the system of concern is in a chaotic state, as is described in the aforementioned literature "Physical Review Letters", 50 (1983), pp. 346–349.

Further, a method of discriminating the chaos and the noise from each other by using prediction for values of variation in a time series is also proposed (see "Nature", 358 (1992) pp. 217–220). According to this method, the chaos and the noise are discriminated from each other by taking advantage of a fact that a correlation coefficient for a predicted value and an actually measured value decreases exponentially in the case of chaos as a function of a prediction period or interval representing an extent to which the prediction is performed, while the correlation coefficient decreases in accordance with low power in the case of the noise having autocorrelation. On the other hand, in the cases of the noise exhibiting no correlation, the correlation coefficient mentioned above assumes a small value independent of the prediction interval.

In the hitherto known apparatus for performing a control while paying attention to the chaotic character of data for an object under control, signals resulting from the embedding processings executed on the time series obtained from the object in the past are previously stored in a memory, wherein data bearing similarity to the time series most recently fetched is extracted from the memory to thereby predict a trend in the near future on the basis of a trend which the extracted data exhibits, for thereby reflecting the result of the prediction to the control, as is disclosed in "Prediction and Control by Chaos Fuzzy Controller": Electronics, February, 1993, pp. 72–76.

However, the chaos evaluating methods known heretofore suffer from a problem that the correlation dimension cannot be calculated appropriately, although it depends on the data, thus rendering the chaotic character evaluating method to be of no use. Besides, when variation of data exhibits the correlation, as usually encountered, the correlation dimension may be saturated to a constant value even when the variation is attributable to the noise rather than the chaos, as reported in "Physics D", 35 (1989) pp. 357–381 and "Physics Letters A", 155 (1991), pp. 480–493. Thus, the methods known heretofore are not in the position to make decision as to whether variation in the time series data which exhibits autocorrelation is brought about by chaos or by noise, giving rise to an additional problem.

Further, in the case of the method in which prediction for values of variation is adopted for discriminating chaos from noise by taking into account the prediction period dependency of the correlation coefficient of the predicted value and the actually measured value, there may arise such situations that the data itself is imperfect or the number of data is insufficient, thus making it impossible to distinctly discriminate the chaos from the noise.

SUMMARY OF THE INVENTION

An object of the present invention is to provide a method which is capable of positively determining whether variation of time series data which appears to behave irregularly at a sight is brought about by chaos or by noise.

The above object of the present invention can be achieved by performing two types of predictions for variation in a given time series and comparing the results of the predictions with each other.

According to one of the variation predicting procedures mentioned above, variation in a given time series is predicted to thereby determine a degree of coincidence or error (difference) between a predicted value and an actual value, i.e., determine degree of accuracy of fit. According to the other variation predicting procedure, reverse variation in the time series is determined to thereby determine a degree of accuracy of the prediction. When the degrees of accuracy in both the predictions mentioned above differ from each other, determination can then be made to the effect that the variation in the given time series is attributable to chaos. On the other hand, when both of the degrees of accuracy are substantially equal to each other, a determination is then made that the variation of concern is attributable to the noise. At this juncture, it should be understood that the forward prediction regards a prediction for variation in the future and that the reverse prediction regards a prediction equivalent to the prediction for variation toward the future which is performed for a time series obtained by reversing the sequence of the given time series.

The present invention has been realized, starting from the observation that in the time series undergoing variation brought about by chaos, entropy of a time series resulting from the reversal of the sequence becomes greater than that of a given time series. In the case of a chaotic time series, prediction for variation becomes more difficult to hit as the entropy increases. Accordingly, the result of the prediction for the variation of a given time series and the result of the prediction for the variation of the reversed time series will become different from each other. On the other hand, a time series suffering from the noise can be characterized by stochastic quantities such as a mean value, variance, auto-correlation and the like. Since the stochastic quantities of the noise will remain unchanged even when the sequence or order of the time series is reversed, the results of the predictions for variation should ideally be same for the reversed time series and the original time series. In actuality, the results of both predictions for variation may not exactly coincide with each other due to stochastic variance in the data itself and the results of predictions. However, so long as the results of both the predictions are substantially in coincidence with each other, a determination may then be made that a variation in the time series is due to noise.

When variation of values of a time series is of chaotic nature or character, the degree of accuracy of the prediction for variation depends on the Lyapunov exponent which is a quantity representing behavior of variation of a system which conforms to a deterministic rule. In general, in this kind of system, there are found a plurality of Lyapunov exponents. When any one of the Lyapunov exponents is positive, variation of the system is chaotic. More specifically, the degree of accuracy of the prediction on a sum of positive Lyapunov exponents, the sum being referred to as the entropy. Thus, the entropy represents a rate at which information of time series changes. It is known that the prediction becomes more difficult to hit or fit as the entropy increases.

A new time series obtained by reversing the sequence of a given chaotic time series will equally vary in accordance with the deterministic rule which corresponds to that of the original time series but the sequence of the time is reversed. In that case, the Lyapunov exponent of the system represented by the new time series can be given in terms of the Lyapunov exponent having the sign reversed in the system represented by the original time series.

So far as the chaotic variation is observed, the system undergoing variation must be stable, and a sum of Lyapunov exponents for that system must have a minus sign, as is known in the art. Accordingly, the entropy of the new time series generated artificially by reversing the temporal sequence of the original time series must be greater than the entropy of the latter. For these reasons, it can be concluded that in the time series resulting from reversal of the temporal sequence of the original time series, the result of prediction for variation is degraded when compared with that for the original time series.

Magnitude relation of the entropies described above can be demonstrated as follows. It is assumed that the Lyapunov exponents which are not zero exist in the original system in a number n and represented by $\lambda_1, \lambda_2, \ldots, \lambda_{n-1}, \lambda_n$ in the order of magnitude and that the Lyapunov exponents $\lambda_1$ to $\lambda_j$ are of plus sign with $\lambda_{j+1}$ to $\lambda_n$ being of minus sign. Based on that assumption, entropy of the original system is given by $$K = \sum_{i=1}^{j} \lambda_i \quad (1)$$

Since the Lyapunov exponents of plus sign become $-\lambda_{j+1}$ to $-\lambda_n$ in the new system, entropy thereof is given by $$K' = - \sum_{i=j+1}^{n} \lambda_i \quad (2)$$

On the other hand, since $$\sum_{i=1}^{n} \lambda_i < 0 \quad (3)$$

K−K'<0 and hence $$K'>K \quad (4)$$

In this way, by comparing the result of prediction for variation in a given time series and the result of prediction for variation in a reversed time series relative to the given time series according to the teaching of the present invention, it is possible to discriminate chaos and the noise from each other essentially without fail.

In conjunction with application of the chaos to a control system, the prior art techniques mentioned previously suffer from following problems which are enumerated below. As a first problem, it must be pointed out that because the time series signal itself is presumed to be chaotic, configuration of a control system for predicting a trend of disturbance components for the purpose of eliminating the disturbance and reflecting it to the control cannot definitely be determined when chaotic variation is superposed as disturbance on the state or phase variation of an object under control.

As a second problem, it should be pointed out that although prediction and control can be performed satisfactorily, even when the time series signal itself represents chaos by resorting to the hitherto known techniques so long as variation in the time series of the object under control constantly exhibits a uniform chaotic characteristic. It is no longer possible to perform the control with high accuracy by correspondingly coping with the dynamic variation when the chaotic character of the time series varies dynamically.

The first problem encountered in application to the control system mentioned above can be solved by providing the apparatus with a disturbance component extraction processing equipped with a model of an object under control, an embedding processing for performing embedding on the disturbance components of the time series signal as extracted, a database for predictions which is dedicated for storing the embedded data in the past, and a disturbance component prediction processing for predicting disturbance components on the basis of the contents of the prediction-dedicated database and the output of the embedding means. Furthermore, when a model for the object under control is unknown, a model identification process for constructing a model for the object may be included in the disturbance component extraction processing. On the other hand, the second problem can be solved by providing the apparatus with a plurality of control/prediction processings, a chaotic character evaluation processing for determining the chaotic character of the time series signal on the basis of the data embedded from the time series signal as fetched, and a switching processing for selecting the processing to be validated for output operation in dependence on the result of the evaluation of the chaotic characteristic.

The disturbance component extraction processing receives, as an input thereto, the same value which the apparatus outputs to the object under control. Subsequently, the difference between the time series signal actually output from the object under control and the output from the model is transferred to the embedding processing. Through the embedding processing, the time series signal is reconstructed on a high-dimensional space, with a dimension being determined previously. The prediction-dedicated database stores therein the signals reconstructed in the past, and in the disturbance component prediction processing, the prediction-dedicated database is searched for extracting the data similar to the data output from the embedding processing. On the basis of the trend indicated by these real value data, the values of disturbance components which are expected to be applied after the lapse of certain time are predicted. Further, through the model identification processing, the input to the object under control as well as the output therefrom are fetched to thereby acquire a universal relation between them by learning, whereupon the model for the object under control is reconstructed with high accuracy.

Further, through the chaotic character evaluation processing, similar embedding processing is performed onto the time series signal input from the object under control, whereupon the correlation dimension or the Lyapunov exponent which is one of the measures indicating chaotic characteristics is calculated on the reconstructed data, to thereby determine quantitatively whether the input time series is chaotic or to what extent the input time series has the chaotic characteristic. On the basis of the result of this processing, an appropriate one is selected from the control/prediction processings provided in plurality through the switching processing to determine the processing to be used for the determination of the final output.

BRIEF DESCRIPTION OF THE DRAWINGS

FIG. 4 is a diagram showing a configuration of an embedded signal storage apparatus.

FIG. 6 is a diagram showing a configuration of a forward prediction storage apparatus.

FIG. 9 is a flow chart for illustrating a reverse prediction processing.

FIG. 15 is a diagram showing a structure of a database for predictions.

DESCRIPTION OF THE PREFERRED EMBODIMENTS

In the following, the present invention will be described in detail in conjunction with exemplary embodiments thereof by reference to the drawings.

Figure 1:
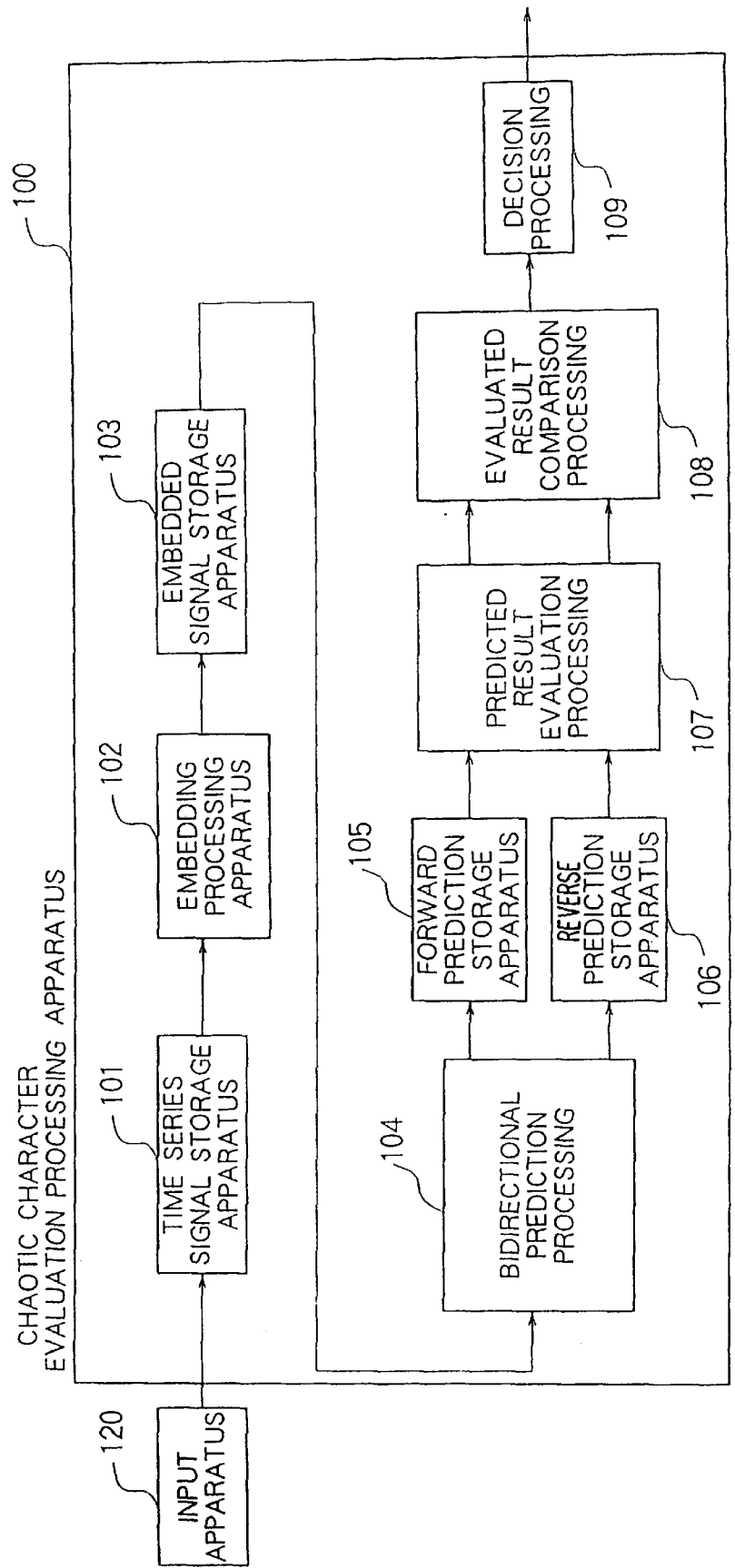
FIG. 1 is a view showing a configuration of an exemplary embodiment of the present invention.

FIG. 1 shows an exemplary embodiment of the present invention which is applied to a prediction for variation of data as realized by making use of an embedding technique.

A chaotic character evaluation processing apparatus 100 is designed to receive a time series signal from an input apparatus 120 to thereby decide whether variation in the time series is brought about by chaos or by noise and output the result of the decision. In the chaotic character evaluation processing apparatus 100, the data received from the input apparatus 120 is first stored in a time series signal storage apparatus 101. The stored data are sent to an embedding processing apparatus 102 to undergo an embedding processing. The data having undergone the embedding processing is stored in a embedded signal storage apparatus 103. A bidirectional prediction processing 104 makes predictions concerning variations in the time series in both the forward and reverse directions respectively, by using the embedded data. In the case of the instant embodiment of the invention, the predictions for variations in the forward and reverse directions are performed at one stroke. The result of the prediction for the variation as performed toward the future is stored in a forward prediction storage apparatus 105. On the other hand, the result for the prediction as performed variation in the reverse direction is stored in a reverse prediction storage apparatus 106. Accuracy of the predictions are then evaluated through a predicted result evaluation processing 107, whereupon both the predictions in the forward and reverse directions, i.e., the predictions toward the future and the past, are compared in respect to the accuracy through a evaluation result comparison processing 108. A decision processing 109 is designed to decide that the variation in the time series is attributable to chaos, when both the predictions mentioned above differ from each in the degree of accuracy. On the contrary, when the degrees of accuracy of both the predictions substantially coincide with each other, the decision processing 109 then determines that the variation of concern is attributable to the noise.

Figure 2:
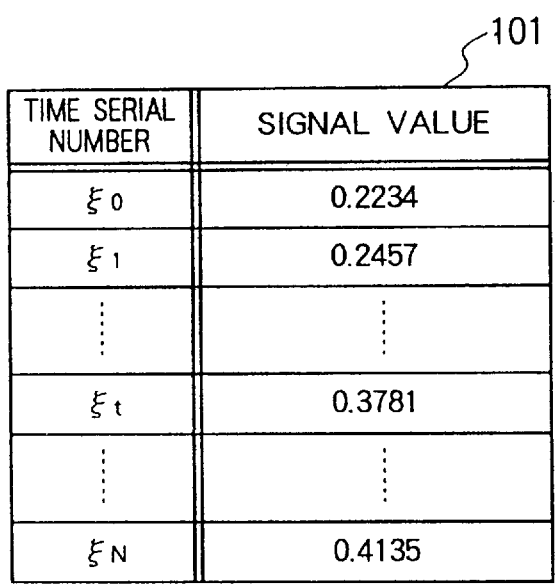
FIG. 2 is a diagram showing a structure of a time series signal storage apparatus.

Next, operations of the individual modules will be elucidated in detail. In the time series signal storage apparatus 101, values of the input signal as fetched time-serially through the input apparatus 120 with appropriate timing are stored together with time serial ID numbers indicating the order or sequence in which the input signal data were fetched as shown in FIG. 2. In this conjunction, the latest data fetched is represented by $\xi_N$ with the succeeding data being represented by $\xi_{N-1}$, $\xi_{N-2}$ and so forth in descending order, starting from the temporally newest one.

Figure 3:
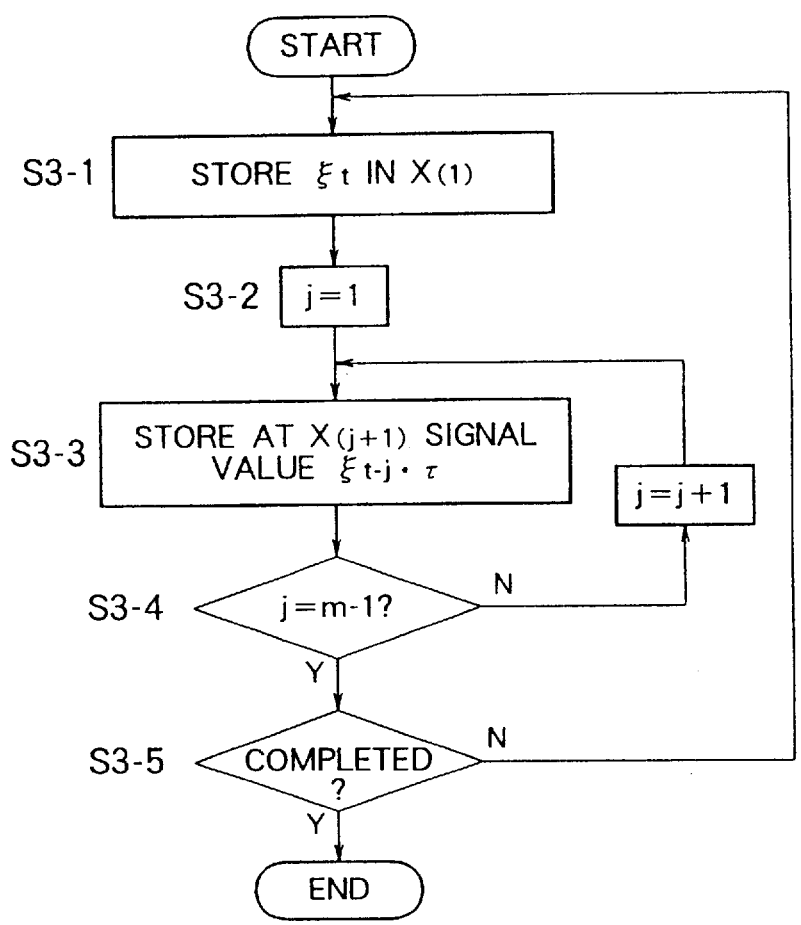
FIG. 3 is a flow chart for illustrating an embedding processing.

FIG. 3 is a flow chart for illustrating the embedding processing 102. In general, with the "embedding processing", it is intended to mean such a processing, in which for the fetched time series signal data given by $$(\xi_0, \xi_1, \xi_2, \ldots, \xi_i, \ldots, \xi_N) \qquad (5)$$

m-dimensional vectors (hereinafter referred to as the reconstructed vectors) given by $$X_N = (\xi_N, \xi_{N-\tau}, \ldots, \xi_{N-j\tau}, \ldots, \xi_{N-(m-1)\tau}) \qquad (6)$$
$$X_{N-1} = (\xi_{(N-1)}, \xi_{(N-1)-\tau}, \ldots, \xi_{(N-1)-j\tau}, \ldots, \xi_{(N-1)-(m-1)\tau})$$
$$X_{N-2} = (\xi_{(N-2)}, \xi_{(N-2)-\tau}, \ldots, \xi_{(N-2)-j\tau}, \ldots, \xi_{(N-2)-(m-1)\tau})$$
$$\vdots$$
$$X_t = (\xi_t, \xi_{t-\tau}, \ldots, \xi_{t-j\tau}, \ldots, \xi_{t-(m-1)\tau})$$
$$\vdots$$
$$X_n = (\xi_n, \xi_{n-\tau}, \ldots, \xi_{n-j\tau}, \ldots, \xi_{n-(m-1)\tau})$$

are reconstituted.

The vector reconstruction is carried out sequentially, starting from the vector which corresponds to the data having the time serial ID number of "N". In the following description, however, reconstruction of the data having the time serial ID number of t will be considered, only by way of example. At first, in step S3-1, the data $\xi_t$ is stored at a location X(1). Subsequently, in step S3-2, j is set to "1", which is followed by step S3-3 where the data $\xi_{t-\tau}$ is stored at X(2) with the data $\xi_{t-j\tau}$ being stored at X(j+1) in a sequential manner. In step S3-4, it is decided whether the condition that j=m−1 is satisfied. Unless it is satisfied, the processing of the step S3-3 is repeated while incrementing j by "1". On the other hand, when the above condition is satisfied, reconstruction of the data having the time serial ID number t is finished, and the reconstruction of the data having the time serial ID number t-1 is executed. It is determined in step S3-5 whether the processing is to be terminated. When a desired number of the reconstructed vectors are generated, it is decided that the processing be terminated. As a method of setting the value for the delay time τ, there are known a variety of methods such as typified by the one which is disclosed in, for example, "Rev. Modern Physics", 65 (1993), pp. 1344–1346. Further, as the embedding dimension m, there are usually employed "3" or "4". However, the invention is never restricted to any particular value such as mentioned above, but the dimension m may be set to appropriate values depending on individual applications which the invention can find.

FIG. 4 shows a configuration of the embedded signal storage apparatus 103 constituted through the embedding processing 102. In correspondence to the time serial ID numbers of "N" to "t" to "n", the reconstructed m-dimensional vectors consisting of the components X(1) to X(m) are stored.

Figure 5:
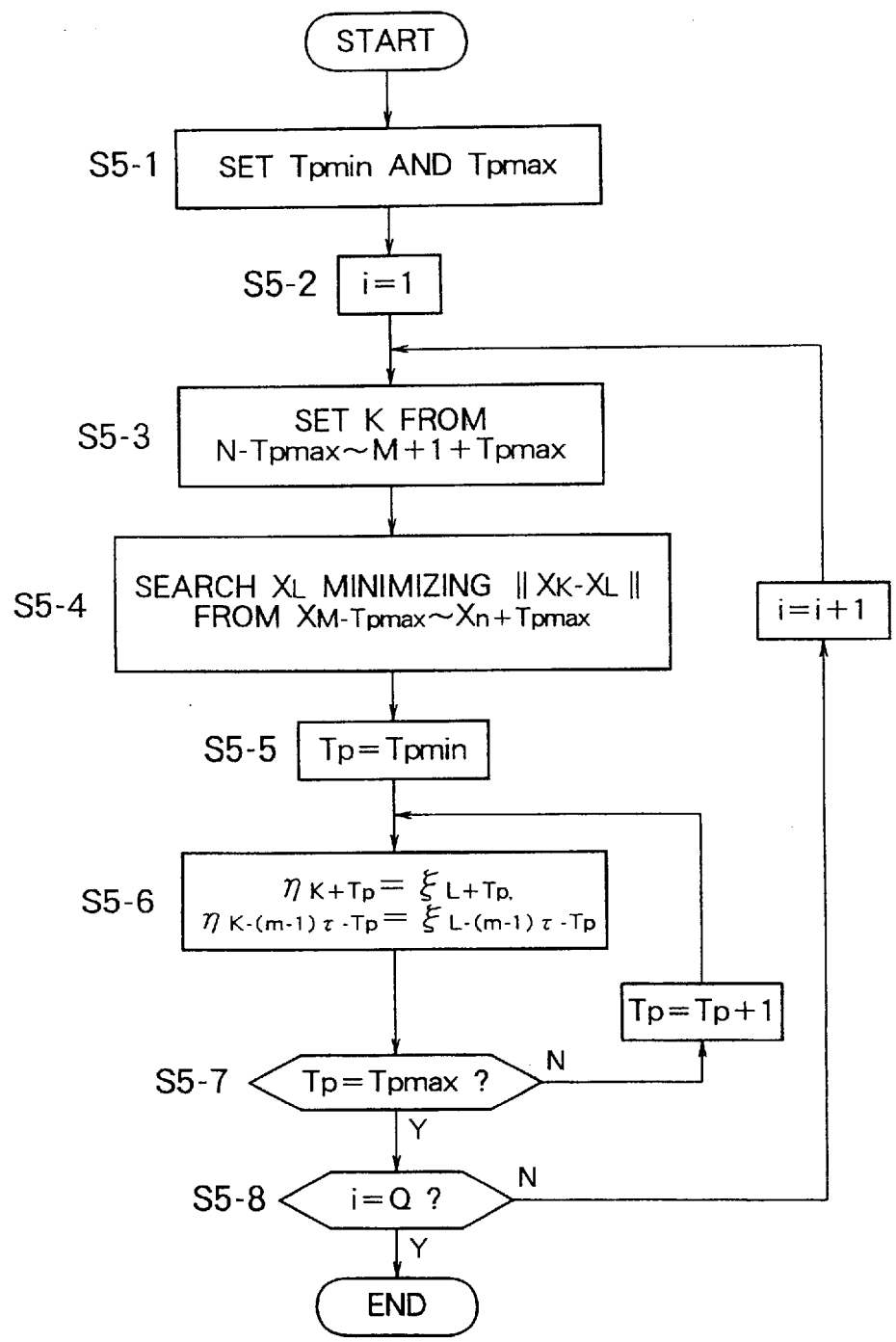
FIG. 5 is a flow chart for illustrating a bidirectional prediction processing.

Through the bidirectional prediction processing 104, data for predictions which are to be evaluated by the prediction result evaluation processing 107 are generated by using the reconstructed vectors stored in the embedded signal storage apparatus 103. FIG. 5 shows the bidirectional prediction processing 104 in a flow chart. At the beginning, a set of the reconstructed vectors is divided into two subsets containing the temporally earlier data $X_M$ to $X_n$ and the temporally later data $X_N$ to $X_{M+1}$, wherein the temporally earlier data $X_M$ to $X_n$ are used as a database for the predictions while the temporally later data $X_N$ to $X_{M+1}$ are used as a database for evaluating the degree of accuracy of the prediction.

In the step S5-1 shown in FIG. 5, the minimum value Tpmin and the maximum value Tpmax are set for defining the range of the steps through which the predictions are to be performed forwardly to the future and backwardly to the past, respectively.

In step S5-2, a counter i is set to "1".

In step S5-3, the ID number K is selected from N−Tpmax to M+1+Tpmax in the time serial ID numbers N to M+1 of the database dedicated for evaluation. In the procedure described below, it is assumed that the prediction is made for the value of $\xi_{K+Tp}$ distanced toward the future by Tp steps relative to the first component $\xi_K$ which is the temporally newest one of the components of the reconstituted vector $X_K$ and for the value of $\xi_{K-(m-1)\tau-Tp}$ distanced toward the past by Tp steps relative to the m-th component $\xi_{K-(m-1)\tau}$ which is the temporally oldest component, and that a procedure referred to as the prediction by zeroth-order approximation is adopted in the case of the instant embodiment.

In step S5-4, the vector located closest to the vector $X_K$ is searched from the reconstructed vectors stored in the database for predictions. In that case, the distance may accord with either of the Euclid norm or the Hamming norm. Of course, other distance calculation methods such as that for a maximum distance may be used substantially to the same effect. In the description which follows, it is assumed that the vector searched is a vector $X_L$.

In step S5-5, the step number Tp is set to Tpmin.

In step S5-6, the value $\xi_{L+Tp}$ of the time series signal distanced forwardly by Tp steps relative to the first component $\xi_L$ of the vector $X_L$ is determined as the predicted value $\eta_{K+Tp}$ for the component $\xi_{K+Tp}$ with the m-th component $\xi_{L-(m-1)\tau-Tp}$ of the vector $X_L$ being determined as the predicted value $\eta_{K-(m-1)\tau-Tp}$ for the component $\xi_{K-(m-1)\tau-Tp}$. The predicted value $\eta_{K+Tp}$ and the actually measured value $\xi_{K+Tp}$ are stored in the forward prediction storage apparatus 105, although illustration thereof is omitted. The actually measured value $\xi_{K+Tp}$ is the first component of the reconstructed vector $X_{K+Tp}$ stored in the database dedicated for evaluation. Through a similar procedure, the predicted value $\eta_{K-(m-1)\tau-Tp}$ and the actually measured value $\xi_{K-(m-1)\tau-Tp}$ are stored in the reverse prediction storage apparatus 106. The actually measured value $\xi_{K-(m-1)\tau-Tp}$ corresponds to the m-th component of the reconstructed vector $X_{K-Tp}$ stored in the database for evaluation.

In step S5-7, a decision is made as to whether or not the step number Tp has reached the limit Tpmax. Unless Tp has reached Tpmax, the processing in the step S5-6 is repeated by incrementing the step number Tp one by one.

In step S5-8, it is decided whether or not a number of sets of predicted value and the actually measured value has attained a predetermined number Q. Unless the predetermined value Q has been attained, the counter is incremented by one, whereupon the step S5-3 is regained.

In step S5-3, a value not used heretofore is set as the next value for K.

FIG. 6 shows an exemplary construction of the data stored in the forward prediction storage apparatus 105 through the procedure described above, wherein there are stored at η(i, Tp) and ξ(i, Tp) the predicted values and the actually measured values, respectively, of the data of the ID number i and the prediction step Tp. In the case of the example shown in FIG. 6, it is assumed that Tp starts from "1". The structure of the data stored in the backward prediction storage apparatus 106 is similar to that shown in FIG. 6.

Through the prediction result evaluation processing 107, correlation coefficients for the predicted values and the actually measured values are calculated as the measures for evaluating the accuracy of the prediction in the individual prediction steps for the prediction in the forward direction and the prediction in the reverse direction by using the data of the predicted values and the actually measured values stored in the forward prediction storage apparatus 105 and the reverse prediction storage apparatus 106, respectively.

On the other hand, through the predicted result comparison processing 108, the results of predictions in both the forward direction and the reverse direction are compared with each other on the basis of the correlation coefficients for the prediction and the actual measurement in the forward and reverse directions as determined through the prediction result evaluation processing 107 mentioned above. In the decision processing 109, it is decided on the basis of results of the comparison whether the variation in the time series is brought about by chaos or by the noise.

More specifically, in the processes mentioned above, it is statistically tested through test processings known per se in each of the prediction steps whether the correlation coefficient for the forward prediction and the correlation coefficient for the reverse prediction can be regarded to be equal to each other. More specifically, representing the prediction/actual measurement correlation coefficient in the prediction forward to the future by $\gamma_f$ while representing the prediction/actual measurement correlation coefficient in the prediction backward to the past by $\gamma_b$ in a given prediction step, quantities $z_f$ and $z_b$ are calculated through the evaluation result comparison processing 108 in accordance with $$z_f = (1/2) \ln [(1+\gamma_f)/(1-\gamma_f)],$$

$$z_b = (1/2) \ln [(1+\gamma_b)/(1-\gamma_b)] \qquad (7)$$

whereupon a value t is determined by using the quantities $z_f$ and $z_b$ in accordance with $$t = |z_f - z_b| \times \sqrt{(Q-3)/2} \qquad (8)$$

where Q represents the number of samples. In the decision processing 109, it is decided that $\gamma_f \neq \gamma_b$ when the above value is greater than a limit value of the test. By way of example, the limit value mentioned above may be set such that t(0.01)=2.58 when the level of significance is 1% and t(0.05)=1.96 when the level of significance is 5%. Thus, when the value t determined in accordance with the expression (8) is greater than the limit value, it is then decided that the coincidence degrees of the predictions in the forward and reverse directions, respectively, differ from each other and thus the variation in the time series is attributable to chaos, while when the value t is smaller than the limit value, it is decided that the aforementioned coincidence degrees are substantially equal to each other and thus variation in the time series is attributable to noise.

In conjunction with the selection of the prediction step Tp mentioned above, it should be mentioned that one appropriate step Tp may be selected when the characteristic or behavior of variation of the system is well known in the relative sense owing to the limitation of the systems to which the chaos evaluating apparatus according to the invention can find application. In that case, the data calculated through the bidirectional prediction processing 104 shown in FIG. 1 and stored in the forward prediction storage apparatus 105 and the reverse prediction storage apparatus 106 may be limited to the data only in the step Tp. However, in general, it is preferred to make decision on the basis of the results obtained from a plurality of prediction steps, the reason for which may be explained below.

By way of example, when the prediction step number Tp is small, e.g. when prediction is made in the closest steps, there may arise such situation that the difference between the forward and reverse predictions does not assume a sufficiently large value, as a result of which the value of t becomes small even when variation in the time series is due to chaos. In that case, t can increase to the level of significance when Tp is increased. On the other hand, the value of t may increase in a given prediction step depending on the statistical nature of the data even when the variation is due to noise. Such being the circumstances, the test should preferably be performed over a plurality of prediction steps so that the time series can be decided as being of chaotic character when the number of prediction steps for which the value of t exceeds the limit value increases beyond a predetermined ratio, e.g. a half of all the prediction steps. In that case, the reliability of the decision can significantly be improved.

The chaotic character decision processing described above may be implemented by hardware or by software.

At this juncture, it should be mentioned that in the case of the embodiment described above, the vectors from $X_n$ to $X_N$ reconstructed in accordance with the expression (6) are divided into two sets for constituting the database for evaluation and the database for predictions in the bidirectional prediction processings. As an alternative, however, it is equally possible to extract two sets of reconstructed vectors from all the reconstructed vectors reconstructed in accordance with the expression (6) such that a sum of the reconstructed vectors in the two sets does not amount to the number of all the reconstructed vectors, wherein they may be allocated to the database for evaluation and the database for prediction, respectively. Besides, two sets of the reconstructed vectors given by the expression (6) may be generated separately from each other, wherein one set may be used as the database dedicated for the prediction with the other being employed as the database for the evaluation.

Figure 7:
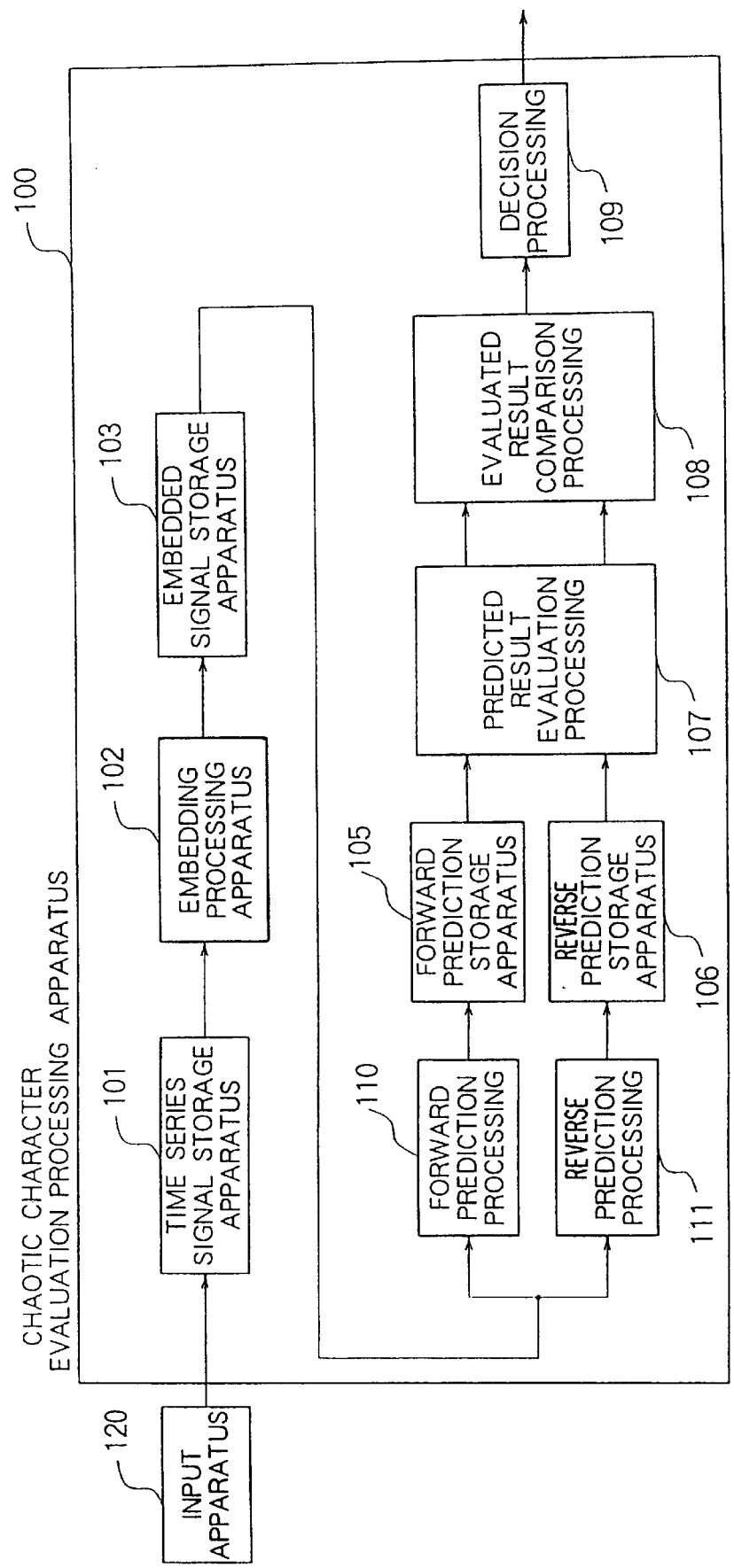
FIG. 7 is a diagram showing a configuration of another exemplary embodiment of the invention.

FIG. 7 shows another exemplary embodiment of the present invention. This embodiment differs from that shown in FIG. 1 in that in place of the bidirectional prediction processing 104 designed for predicting variations of data in both the forward and reverse directions, there are provided separately a forward prediction processing 110 as a first prediction processing for the prediction in the forward direction and a reverse prediction processing 111 as a second prediction processing for predicting variation in the reverse direction. The result of the prediction performed by the forward prediction processing 110 is stored in a forward prediction storage apparatus 105, while the result of the prediction executed by the reverse prediction processing 111 is stored in a reverse prediction storage apparatus 106. The forward prediction processing 110 and the reverse prediction processing 111 may be activated or executed concurrently in parallel or sequentially as the alternative. Obviously, the activation in parallel can reduce the time taken by the calculation because of the concurrent prediction in both the forward and reverse directions.

Figure 8:
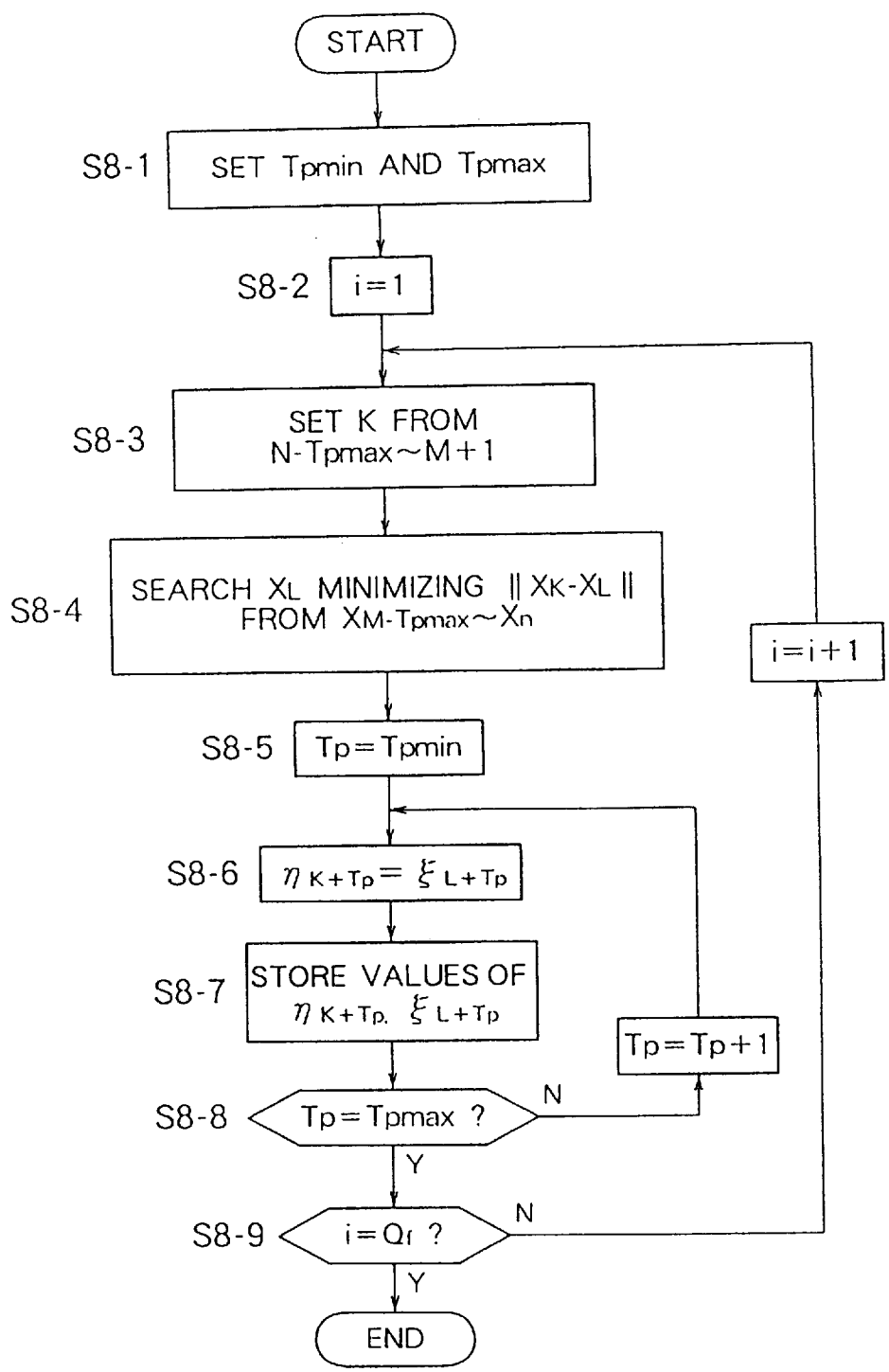
FIG. 8 is a flow chart for illustrating a forward prediction processing.

FIG. 8 shows a flow chart for illustrating the processing to be executed by the forward prediction processing 110. Since this processing is similar to the prediction for variation in the direction toward the future as performed by the bidirectional prediction processing 104 shown in FIG. 5, detailed description thereof will be unnecessary. In step S8-7, the predicted value and the actually measured value are stored in the forward prediction storage means 105.

FIG. 9 is a flow chart for illustrating operation of the backward prediction processing 111. This flow chart is substantially same as that of FIG. 8 except that the prediction is made by tracing back the time series, i.e., in the reverse direction to the past. The reconstructed vectors stored in the embedded signal storage apparatus 103 are separated into temporally earlier vectors $X_S$ to $X_n$ and temporally later vectors $X_N$ to $X_{S+1}$, wherein the latter are used for the database for prediction with the former for the database for evaluation of the prediction.

In step S9-3, the time serial ID number K is selected from S to n+Tpmax in the time series ID numbers S to n allocated to the database for evaluation. Through the procedure described below, prediction is made for the value of a component $\xi_{K-(m-1)\tau-Tp}$ which precedes by Tp steps to the m-th component $\xi_{K-(m-1)\tau}$, the temporally oldest one in the components of the reconstructed vector $X_K$.

In step S9-4, the vector closest to the reconstructed vector $X_K$ is searched from the reconstructed vectors stored in the database for prediction. Representing by $X_L$ the vector as retrieved by the search, the value $\xi_{L-(m-1)\tau-Tp}$ of the time series signal preceding by Tp steps relative to the m-th component $\xi_{L-(m-1)\tau}$ is determined as the predicted value $\eta_{K-(m-1)\tau-Tp}$, as can be seen from step S9-6 shown in FIG. 9.

In step S9-7, the predicted value $\eta_{K-(m-1)\tau-Tp}$ and the actually measured value $\xi_{K-(m-1)\tau-Tp}$ are stored in the reverse prediction storage apparatus 106.

Operations of the other apparatuses or the processings 101, 102, 103, 107, 108 and 109 are similar to those described hereinbefore in conjunction with the exemplary embodiment shown in FIG. 1. However, when the number of sets of the predicted values and the actually measured values differs between the forward and reverse prediction as represented by $Q_f$ and $Q_b$, respectively, t appearing in the expression (8) is given by $t = |z_f - z_b| / \sqrt{[1/(Q_f - 3) + 1/(Q_b - 3)]}$. This expression assumes the form of the expression (8) when $Q_f = Q_b = Q$. At this juncture, it should be noted that in the case of the instant embodiment, the sets of the reconstructed vectors reconstructed in accordance with the expression (6) in both the forward and reverse prediction processings are divided into two subsets for constituting the database for the evaluation and the database for the prediction, respectively. However, it is equally possible to extract two sets of reconstructed vectors from all the reconstructed vectors generated in accordance with the expression (6) such that a sum of the reconstructed vectors in the two sets does not amount to the number of all the reconstructed vectors. In that case, the two sets of the reconstructed vectors may be allocated to the database for evaluation and the database for the prediction, respectively. Besides, by generating two sets of the reconstructed vectors in accordance with the expression (6), one of the sets may be used for the forward prediction processing with the other being used for the reverse prediction processing. In this case, in each of the sets of the reconstructed vectors, the vectors are classified into two subsets to be allocated for the database for the evaluation and the database for the prediction, respectively, or alternatively several of the reconstructed vectors may be extracted from the two subsets such that a sum of the extracted reconstructed vectors does not amount to the number of all the reconstructed vectors belonging to the two subsets, whereupon two subsets of the reconstructed vectors may be allocated to the database for the evaluation and the database for the prediction, respectively.

In the case of the exemplary embodiments described so far, a set of reconstructed vectors as generated is divided into two mutually different subsets to be allocated to the database for the prediction and the database for the evaluation, respectively. It should however be noted that there exists no necessity for dividing the reconstructed vectors in the manners described above, but all the reconstructed vectors may be used for the database for the prediction and the database for the evaluation. Besides, division of the reconstructed vectors may be realized, accompanied with overlap of some ones of the reconstructed vectors. By way of example, when the reconstructed vectors as a whole are to be used for the database for prediction or for the database for evaluation, a reconstructed vector $X_K$ used for evaluation may be selected from the set of the reconstructed vectors and a vector $K_L$ to be used for the prediction which is located closest to the vector $X_K$ may be selected from the same set of the reconstructed vectors.

Further, although it has been assumed in the foregoing description of the exemplary embodiments of the invention that the time series signals fetched via the input apparatus 120 represent the scalar values or quantities, the invention is never restricted thereto. In other words, even when the signals as fetched are a sequence of vector signals, i.e., when a signal $\xi_t$ is represented by $\xi_t=[\xi_t(1), \xi_t(2), \ldots, \xi_t(d)]$ as a d-dimensional vector, it is equally possible to generate a reconstructed vector X(t) through such a procedure as given by the expression (6). In that case, the reconstituted vector is essentially of (m×d) dimensions. At that time, as the object for the prediction, there may be selected one component of the d-dimensional vector signal or a plurality of the components thereof or all of the components.

In the foregoing, the present invention has been described in conjunction with specific exemplary embodiments. However, the invention is never restricted to these specific embodiments.

For instance, in the case of the embodiment illustrated in FIG. 7, prediction of variation in the time series in the reverse direction is carried out by predicting variation in the given time series straightforwardly toward the past. However, instead thereof, a time series may newly be generated by reversing the sequence of the given time series, whereupon the prediction for variation in the reversed time series in the forward direction may be carried out as in the case of the conventional prediction. In that case, the data stored in the time series signal storage apparatus 101 may be rearranged in reverse in the sequence by providing a series reversing processing, and the prediction may be carried out for the reversed time series through a processing similar to the forward prediction processing 110 shown in FIG. 7, whereupon the accuracy of fit or goodness of the prediction may arithmetically be determined by the prediction result evaluation processing. In this conjunction, the forward prediction processing and the prediction result evaluation processing may be carried out in such a manner that two subsets for the prediction of variation in the given time series and the prediction for the reversed time series are prepared, whereon the predictions for the two time series, respectively, may be carried out concurrently in parallel or alternatively the prediction may be performed sequentially for the two time series one by one through an appropriate combination of the forward prediction processing and the prediction result evaluating processing by changing over the data in view of the fact that one and the same processing toward the future can be used in the prediction processing for the two time series. In the case of the predictions made in parallel, the time taken for arithmetic processing or calculation can be shortened, while according to the sequential prediction is adopted, capacity of the memory as required to this can correspondingly be reduced.

It should additionally be mentioned that the prediction method and the prediction result evaluating method are not restricted to those described hereinbefore in conjunction with the illustrated embodiments. By way of example, as the prediction method, there may be adopted a first-order approximation using Jacobian matrix, a piecewise-linear method, a tessellation method, a method based on neural network, a prediction using radial basis functions or the like. When the prediction for variations in the forward and reverse directions is to be performed by resorting to one and the same prediction processing with a neural net, the latter may be implemented in such a configuration as to be capable of outputting the predicted values both in the future and the past. On the other hand, when the variation predicting processing is to be separately provided for the future and the past, respectively, there may be provided separately the corresponding nets, respectively. The same essentially applies to the case where the function expansion such as that executed by using the radial basis functions is adopted. In that case, when the predictions for variations in the future and the past are to be performed through one and the same prediction processing, both the functions for prediction toward the future and that for prediction toward the past may be prepared correspondingly.

As to the evaluating method, those described below may be employed.

According to one method, a relative variance of predicted error is arithmetically determined in place of using the correlation coefficient as the degree of accuracy of the prediction in the prediction result evaluation processing 107. More specifically, there are calculated variance $\sigma_f$ of differences between $Q_f$ values predicted to the future and the actually measured values and variance $\sigma_b$ of differences between the $Q_b$ values predicted backward to the past and the actually measured values. These variances $\sigma_f$ and $\sigma_b$ are divided by variance $\sigma_\xi$ of the time series data for standardization thereof to thereby obtain $e_f=\sigma_f/\sigma_\xi$ and $e_b=\sigma_b/\sigma_\xi$. Through the evaluated result comparison processing 108 and the decision processing 109, it is tested in accordance with the expression (7) and (8) whether or not $e_f$ and $e_b$ differ from each other. When $e_f \neq e_b$, it is decided that the time series is of chaotic nature or character, while when $e_f$ is substantially equal to $e_b$, it is decided that the time series suffers from the noise. In that case, when $Q_f \neq Q_b$, the expression $t=|z_f-z_b|/\sqrt{[1/(Q_f-3)+(1/(Q_b 3)]}$ mentioned previously and equivalent to the expression (8) may be employed in place of the latter.

Alternatively, in the evaluated result comparison processing 108, an absolute value of a difference given by log(1-$\gamma_f$)–log(1-$\gamma_b$) of the errors in the prediction represented by the correlation coefficient between the forward and reverse predictions may be calculated, wherein when the absolute value is greater than a predetermined value d, the time series data may be decided as being of chaotic nature or character. It should be mentioned that the evaluated result comparison processing 108 and the decision processing 109 may be implemented integrally with each other.

Figure 10A:
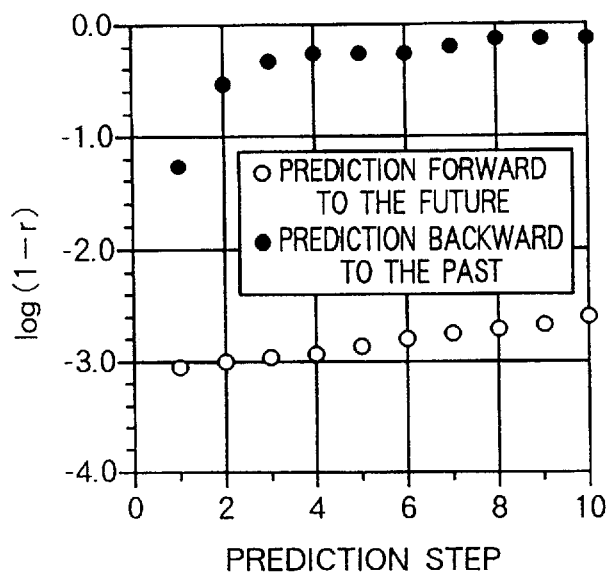
FIGS. 10A and 10B are views showing, by way of example, effectiveness of discrimination between chaos and noise effected according to the invention.
Figure 10B:
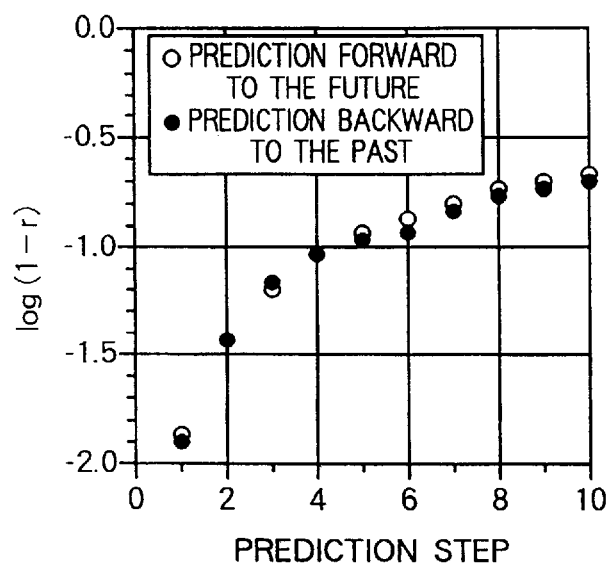

For the purpose of demonstrating the validity and the advantages of the invention, FIG. 10A and FIG. 10B show, only by way of example, the accuracy degrees of the forward and reverse predictions in terms of logarithmic values of prediction errors for time series data which is known as suffering from chaos and time series data which is known as suffering from noise and which is difficult to be discriminated from the time series data of chaotic character by a method known heretofore. More specifically, FIG. 10A shows chaotic time series data generated by the Lorenz equation, and FIG. 10B shows time series data containing noise exhibiting an strong autocorrelation whose power spectrum can be represented by $1/f^2$. The value of the embedding dimension in the case of the example illustrated in FIG. 10A is selected "4", while that of the example shown in FIG. 10B is "3". As can be seen from FIG. 10A, in the case of the chaotic time series data, error or difference between the forward and reverse predictions is significant. On the contrary, in the case of time series data containing the noise, both the predictions result substantially in coincidence.

Figure 11A:
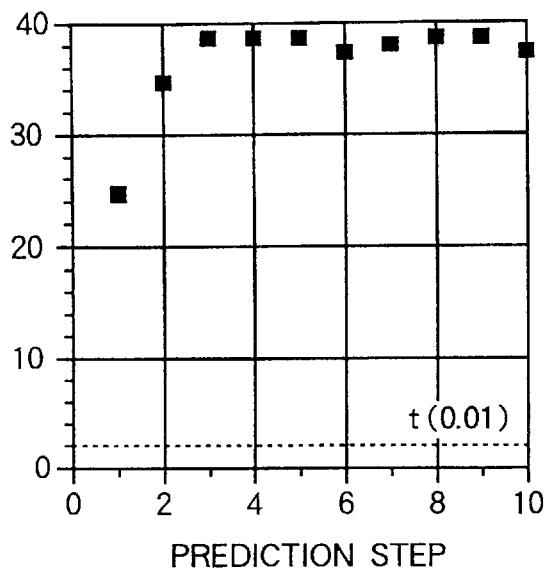
FIGS. 11A and 11B are views showing, by way of example, effectiveness of discrimination between chaos and noise according to the present invention.
Figure 11B:
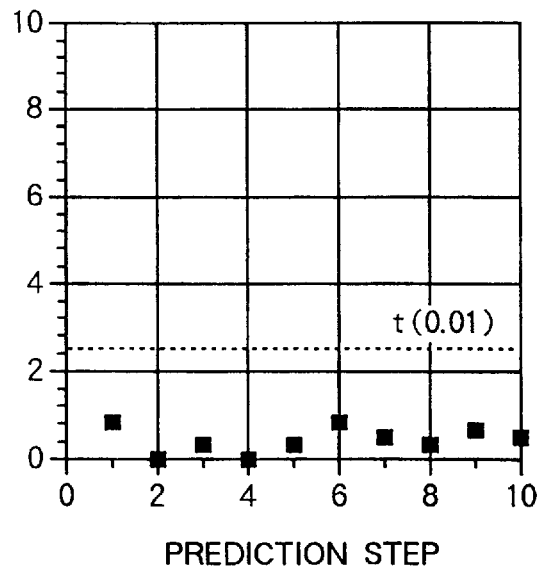

FIG. 11A and FIG. 11B are views corresponding to FIG. 10A and FIG. 10B, respectively, and show values of t plotted at the individual prediction steps. As can be seen from FIG. 11A, in the case of the chaotic time series data generated by the Lorenz equation, the values of t at every prediction step are greater than a limit value. On the other hand, in the case of the time series data containing noise as plotted in FIG. 11B, the values of t are smaller than the limit value. Thus, it can be seen that discrimination of the chaos and the noise from each other is realized correctly.

Description which follows is directed to exemplary industrial apparatuses to which the invention can find application.

Figure 12:
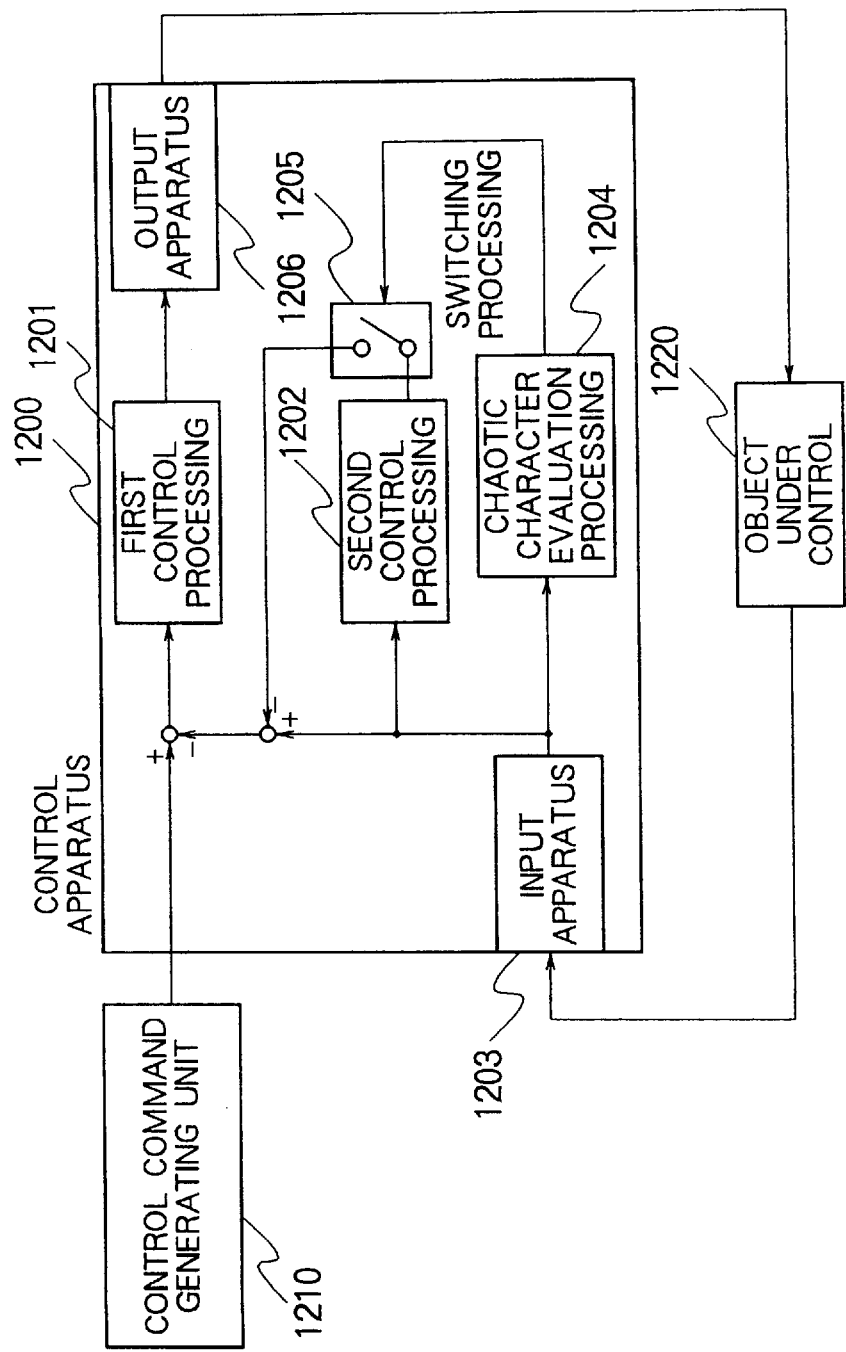
FIG. 12 is a diagram showing a configuration of a control apparatus to which the present invention is applied.

FIG. 12 shows a configuration of a control apparatus to which the invention is applied. Referring to the figure, a control apparatus 1200 receives a control command from a control command generating unit 1210 to output to an object 1220 under control a signal for operating correctly the object 1220 under control in accordance with the control command. The control apparatus 1200 is provided with a plurality of control processings inclusive of a first control processing 1201 and a second control processing 1202. Further, the control apparatus 1200 includes an input apparatus 1203, a chaotic character evaluation processing 1204, a switching processing 1205 and an output apparatus 1206.

In the first place, a flow of processings in general will briefly be described. The input apparatus 1203 fetches a signal from the object 1220 under control to transfer it to the chaotic character evaluation processing 1204 and the second control processing 1202. The chaotic character evaluation processing 1204 decides whether or not the signal as inputted is of chaotic character, to thereby control correspondingly the activation or inactivation of the switching processing 1205. The second control processing 1202 receives the output from the input apparatus 1203 to thereby transfer the result of operation to the switching processing 1205. The output mentioned above can be employed as a valid signal in the processings mentioned below or invalidated. A value resulting from subtraction of the output of the switching processing 1205 from that of the input means 1203 can be regarded essentially as representing a feedback signal derived from the object 1220 under control, and a control deviation or difference between the feedback signal and the output of the control command generating unit 1210 can be used as the input signal to the first control processing 1201, which then outputs to the output apparatus 1206 the result of the arithmetic operations defined previously. The output apparatus 1206 in turn outputs a value which represents the result of the aforementioned arithmetic operation to the object 1220 under control.

As the chaotic character evaluation processing 1204, there can be employed the chaotic character evaluation processing 100 described hereinbefore by reference to FIG. 1 or FIG. 7. The switching processing 1205 is switched on when the time series signal supplied from the input apparatus 1203 is determined as exhibiting the chaotic character, while the switching processing 1205 is switched off unless the above signal is determined to be chaotic. When the switching processing 1205 is switched on, the output of the second control processing 1202 is validated while it is invalidated when the switching processing 1205 is off.

Figure 13:
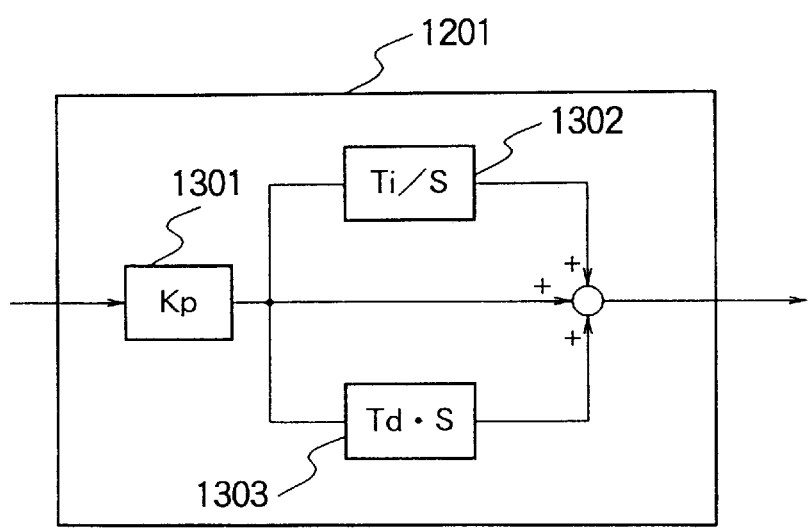
FIG. 13 is a diagram showing a configuration of a first control processing.

FIG. 13 shows a configuration of the first control processing 1201. It is assumed, by way of example only, that the first control processing 1201 is a conventional PID control system in which the control difference given as the input signal is multiplied by a proportional gain in a module 1301, the result of which then undergoes an integration processing in a module 1302 while undergoing a differentiation processing in a module 1303. Thus, as a result of the first control processing, there is outputted a sum of the results of the multiplication by the proportional gain and the results of the integration processing and the differentiation processing. As the control processing, there may be employed any one of processings such as an optimization control system, adaptive control system and other so far as the processing is suited for the control of an object of concern.

Figure 14:
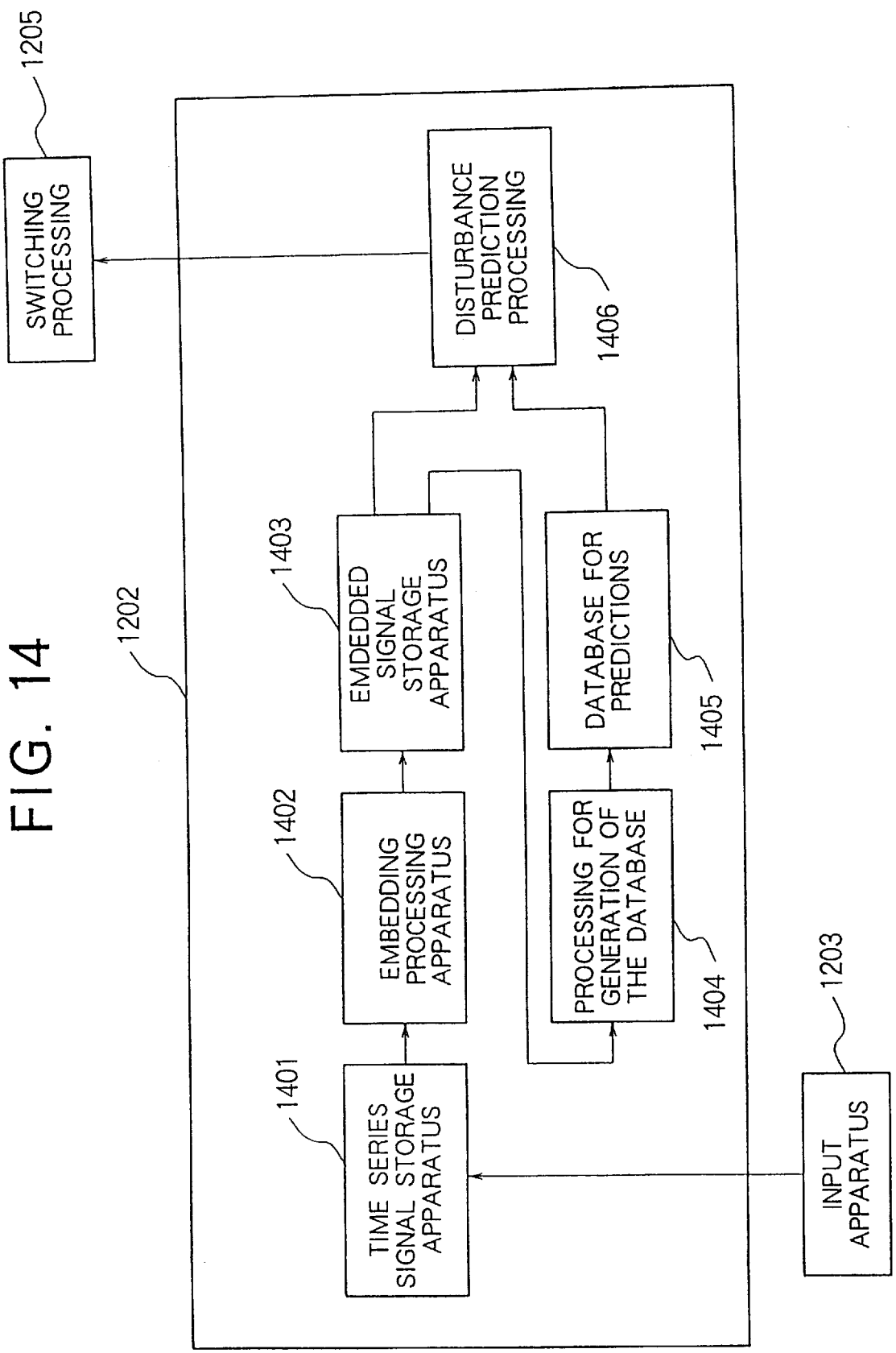
FIG. 14 is a diagram showing a configuration of a second control processing.

FIG. 14 shows a configuration of the second control processing 1202. In the case of the instant embodiment, it is assumed that the second control processing is so arranged as to predict a value of disturbance which will be applied in the near future on the basis of a value of the closest disturbance component on the assumption that chaotic disturbance is superposed on the input signal. The processing executed by a time series signal storage apparatus 1401 in response to reception of a time series signal from the input apparatus 1203, an embedding processing apparatus 1402 and an embedded signal storage apparatus 1403 may be same as the processings 101 to 103 shown in FIG. 1, respectively. Accordingly, repeated description in detail thereof will be unnecessary.

A processing apparatus 1404 for generation of the database for the prediction is adapted to store the contents outputted from the embedded signal storage apparatus 1403 which vary from time to time in a pair at adjacent time points (distance between which will hereinafter be represented by $\Delta t$). FIG. 15 shows a database for the predictions generated in this manner. In a database 1405 dedicated for the predictions, there is stored pairwise an embedding signal at a time point (t2) temporally distanced by $\Delta t$ from an embedding signal at a given time point (t1). By way of example, as can be seen from a row identified by the number "1" in FIG. 15, the reconstructed vectors (0.2234, 0.2457, 0.2681, ..., 0.3781) at the time point t1 change to the reconstructed vectors (0.2457, 0.2681, 0.3259, ..., 0.4001) correspondingly after lapse of the time $\Delta t$. The database 1405 for predictions stores pairwise therein a large number of data of this kind.

Figure 16:
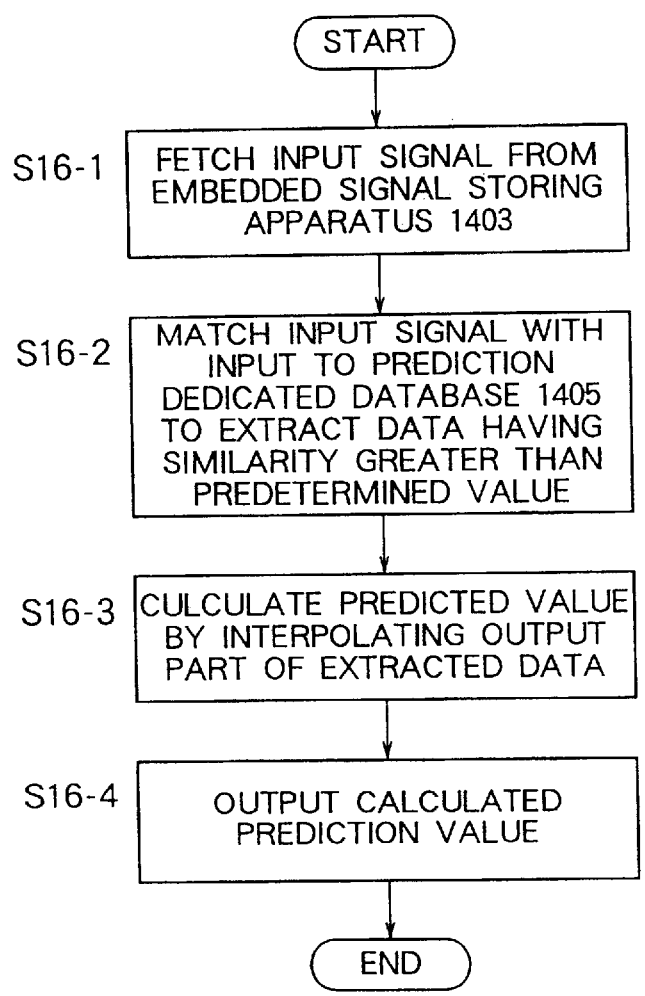
FIG. 16 is a flow chart for illustrating a disturbance prediction processing.

FIG. 16 shows a flow chart of a disturbance prediction processing 1406.

Referring to the figure, in step S16-1, the nearest reconstructed vector $X_N$ is fetched as the input signal from the embedded signal storage apparatus 1403. In a succeeding step S16-2, the reconstructed vector $X_N$ as inputted is compared with the input (embedded signal at the time point t1) of the database for prediction, to thereby extract the data having a similarity which exceeds a predetermined value. When the similarity R is decided in terms of a spatial distance, the former assumes a greater value as the spatial distance becomes smaller. Thus, when $X_N$ is given by $(a_1, a_2, \ldots, a_m)$ with the data extracted from the database 1405 for predictions being represented by $(b_1, b_2, \ldots, b_m)$, the similarity R can be represented by the expression (9) mentioned below on the presumption that the similarity R is defined as a value which is in reverse proportion to the spatial distance. Namely, $$R=1/(a_1-b_1)^2+(a_2-b_2)^2+ \ldots (a_m-b_m)^2 \tag{9}$$

In step S16-2, the database 1405 for predictions is searched for extracting or retrieving the data whose similarity R to the reconstructed vector as fetched is greater than a predetermined value inclusive thereof. When a plurality of data are extracted, the output parts thereof (the embedded signal at the time point t2) are interpolated in step S16-3 for arithmetic determination of the predicted value. For the interpolating operation, it is assumed that the number of the extracted data is p, the value of the output parts are represented by $(c_{11}, c_{12}, \ldots, c_{1m}), (c_{21}, c_{22}, \ldots, c_{2m}), \ldots, (c_{p1},$ $c_{p2}, \ldots, c_{pm}$), respectively, and that the similarities to the reconstructed vectors are represented by $R_1, R_2, \ldots, R_m$. On these assumptions, the predicted value can be calculated by summing the values $c_{11}$ to $c_{p1}$ of the output parts weighted with the similarities in accordance with the following expression:

$$S = \sum_{i=1}^{p} (R_i \cdot c_{i1}) / \left( \sum_{i=1}^{p} R_i \right) \quad (10)$$

In step S16-4, the predicted value S calculated in this way is outputted to the switching processing 1205. As described previously, the switching processing 1205 is so designed that when the time series signal detected from the object 1220 under control is chaotic, the predicted value S is subtracted from the detected value, while this processing is neglected unless the time series signal is chaotic. Accordingly, when chaos makes an appearance intermittently as well as when the chaotic character of the time series signal varies as a function of time, there can be realized the disturbance-eliminated characteristic in which both the cases mentioned above are taken into account.

Parenthetically, it should be mentioned that in the second control processing 1202, the time series signal storage apparatus 1401, the embedding processing 1402 and the embedded signal storage apparatus 1403 may be realized in common to the time series signal storage apparatus 101, the embedding processing 102 and the embedded signal storage apparatus 103, respectively, in the chaotic character evaluation processing apparatus 100. In that case, the processing 1404 for generation of the database for prediction and the disturbance prediction processing 1406 fetch the reconstructed vectors from the embedded signal storage apparatus 103. Thus, the configuration as a whole can be simplified.

Figure 17:
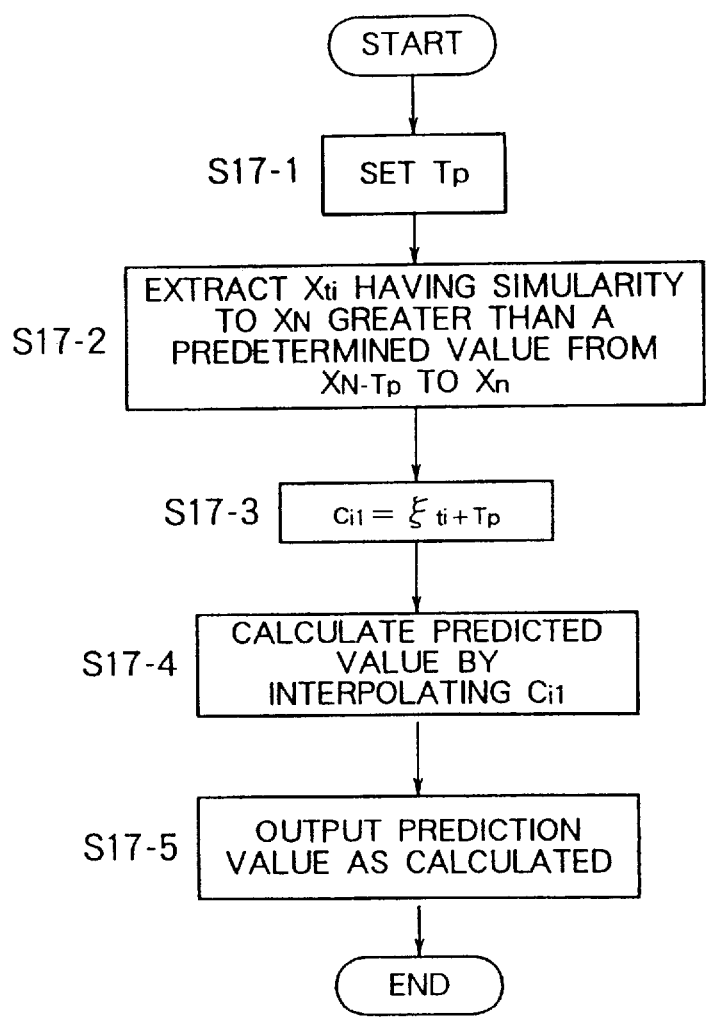
FIG. 17 is a flow chart for illustrating another example of processing executed by the disturbance prediction processing.

Besides, the processing 1404 for generation of the database for prediction as well as the database 1405 for predictions may be spared. In that case, in the disturbance prediction processing 1406, the processing shown in a flow chart in FIG. 17 may be adopted in place of the processing flow shown in FIG. 16.

More specifically, in step S17-1, the prediction steps equivalent to a time difference Dt are prepared, which is then followed by step S17-2 in which the reconstructed vector whose similarity to $X_N$ is not smaller than a predetermined value is selected from $X_{N-TP}$ to $X_n$ stored in the embedded signal storage means, and every time the reconstructed vector is determined, the time series value preceding by Tp steps to the first component of the reconstructed vector as determined is selected as the output value $c_{11}$, as shown in step S17-3, whereon steps S17-4 and S17-5, the processings corresponding to those in the steps S16-3 and S16-4 shown in FIG. 16, are performed.

In this conjunction, i represents the identification numbers of the reconstructed vectors having the respective similarities greater than the predetermined value, if a plurality of such reconstructed vectors exist. In this way, the database for predict ions can be spared, whereby the capacity of a memory used for the database can be reduced to an advantage.

In the case of the exemplary application of the invention described above, the switching processing 1205 is switched on when the time series signal supplied through the input apparatus 1203 is decided as being chaotic, and, if otherwise, the switching processing 1205 is switched off. As an alternative to this, a processing mentioned below may be adopted. Namely, even when the signal is determined as not being chaotic, the result of prediction for the disturbance can be relied on, when the accuracy of the forward prediction in the chaotic character evaluation processing 1204 is high. Thus, the switching processing 1205 is switched on to thereby validate the output of the prediction of disturbance from the second control processing 1202. In that case, a method of calculating the accuracy of the prediction and a threshold level is previously determined so that the switching processing 1205 is switched on when the goodness degree exceeds the thresh old value. On the contrary, even when the time series signal is decided as being chaotic, the switching processing may be switched off to thereby invalidate the second control processing, if the accuracy of the prediction is smaller than another threshold value determined separately from the aforementioned threshold value.

Figure 18:
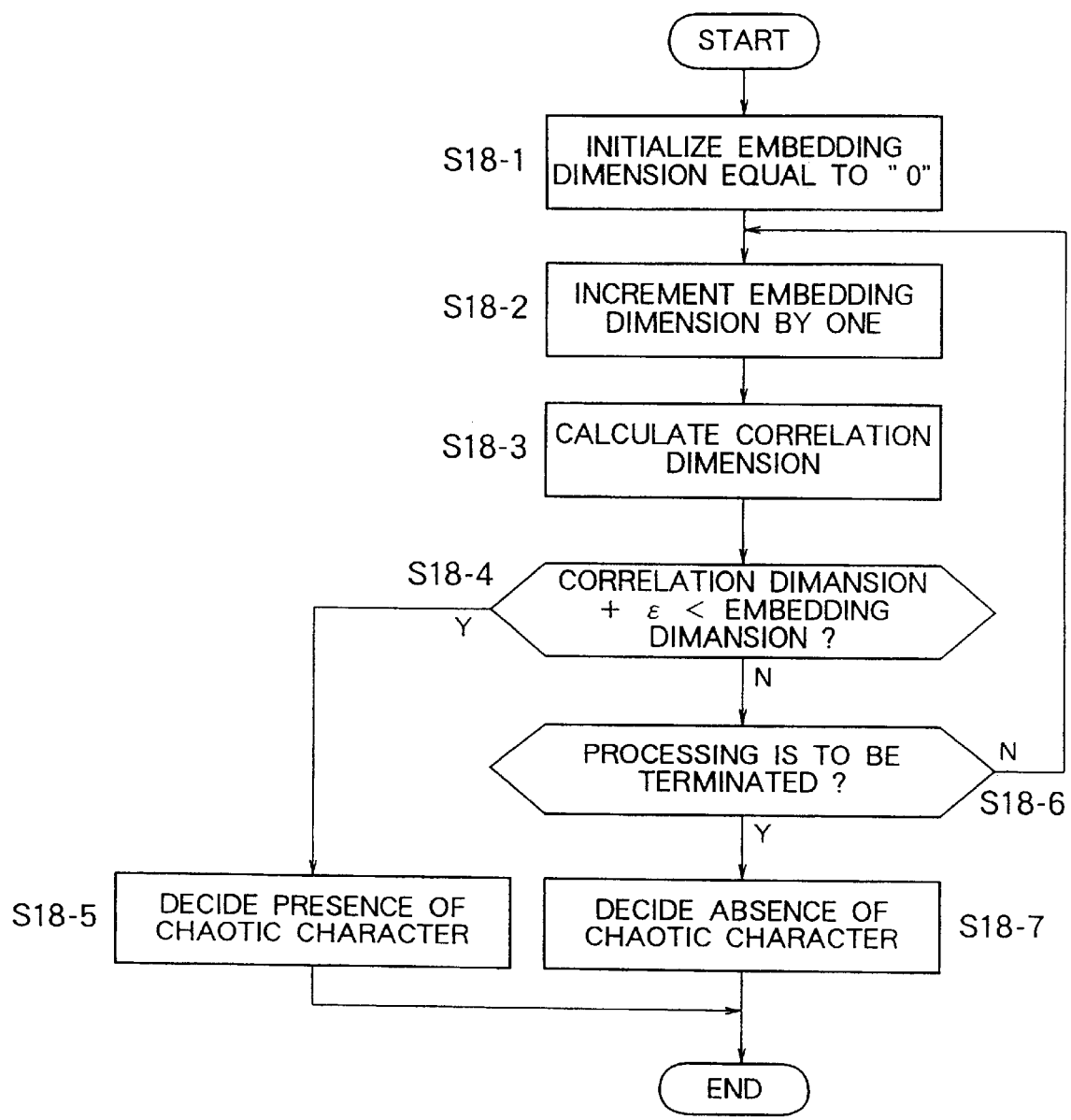
FIG. 18 is a flow chart for illustrating another example of processing executed by chaotic character decision apparatus.

FIG. 18 shows, by way of example, a flow chart for illustrating the chaotic character evaluation processing apparatus 100. Execution of the processing is performed on the data stored in the embedded signal storage apparatus 103. In step S18-1, "0" is set as an initial value for the embedding dimension. In step S18-2, the embedding dimension is incremented by one, which is then followed by step S18-3 where the correlation dimension is calculated. The phrase "embedding dimension" as used herein in conjunction with the instant embodiment of the invention corresponds to the number of the data $X_t(1)$ to $X_t(m-1)$ corresponding to N to t to n shown in FIG. 4 which are used in calculating the correlation dimension. When the embedding dimension is "2", the correlation dimension is calculated by using the data $X(1)$ and $X(2)$, while when the embedding dimension is "3", the correlation dimension is calculated by using $X(1)$, $X(2)$ and $X(3)$. The correlation dimension can be calculated on the basis of relation between the correlation integral and the integration domain. In general, the correlation integral can be given by the following expression (11):

$$C^m(r) = \lim_{N \to \infty} \left\{ \frac{1}{(N-n)^2} \sum_{i,j=N, i \neq j}^{n} H(r - |X_i - X_j|) \right\} \quad (11)$$

where H represents the Heaviside function:

$H(x)=0 \quad (x \leq 0)$ $H(x)=1 \quad (x>0)$ m represents dimension of a space reconstructed, and $|X_i-X_j|$ represents a distance according to the Euclid norm between $X_i$ and $X_j$.

In the expression (11), the integration domain is a hyper-sphere having a radius r. It is practically impossible to execute "lim"-operation in the strict sense. However, by the calculation in accordance with the expression (11) where as many reconstructed vectors as possible are used, a satisfactory value can be determined at least approximately. By scaling the result of this calculation in accordance with $$C^m(r) = \alpha r^{\nu(m)} \quad (12)$$

where α represents a constant, the correlation dimension can be given as a function $\nu(m)$ of the embedding dimension m. In step S18-4, it is decided whether or not a value resulting from addition of a given value ε to the correlation dimension is smaller than the embedding dimension. Unless the time series signal is chaotic, the correlation dimension assumes a value which coincides with that of the embedding dimension regardless of the value of the embedding dimension. However, when the time series signal is chaotic, the correlation dimension becomes saturated irrespective of the embedding dimension and assumes a substantially constant value in a range beyond a certain value of the embedding dimension. In step S18-4, the processing for deciding the saturation of the correlation dimension is executed. In the case of the instant embodiment of the invention, there is adopted a method of deciding approximately whether or not the correlation dimension becomes a smaller value than the embedding dimension in the course of operation for calculating the correlation dimension by incrementing the embedding dimension one by one. The purpose of adding the value $\epsilon$ is to compensate for error involved in the operation for calculating the correlation dimension. This value $\epsilon$ may be a constant or set appropriately as a function of the embedding dimension and the correlation dimension. When the inequality condition in the step S18-4 is satisfied, the presence of the chaotic character is determined in step S18-5, whereupon the processing comes to an end. Unless the inequality condition is met, the processing is decided to be terminated in step S18-6. When the processing is not to be ended at this time point, the step S18-2 is regained to increment the embedding dimension by one, whereupon execution of the similar processing is repeated.

When the processing is decided to be ended, absence of the chaotic character or behavior is determined in step S18-7. The termination of the processing may conveniently be determined by detecting coincidence between the embedding dimension and a predetermined upper limit value. However, the processing may equally be terminated upon lapse of a predetermined time allocated to the processing.

The result of the chaotic character evaluation processing described above is sent to the switching processing 1205, which is switched on when decision is made that the time series signal obtained via the input apparatus 120 suffers from chaos and, if otherwise, switched off. When the switching processing 1205 is on, the output of the second control processing 1202 is validated, while it is invalidated when the switching processing 1205 is off.

At this juncture, it should be added that as an index for characteristic determination of the chaotic character of time series data, the degree or significance of the chaotic character may be taken into account in addition to determination solely of presence or absence of the chaotic character. The degree or significance of the chaotic character may be defined as mentioned below. Namely, greater degree or significance of the chaotic character means that variation in the series data is of highly deterministic character. To say in another way, the degree or significance of the chaotic character indicates the extent to which the time series data can orderly be structured. For this reason, when the correlation dimension is small and/or when the maximum Lyapunov exponent is small and/or when the prediction of variation hits at a high ratio and so forth, this means that the degree or significance of the chaotic character is great.

Figure 19:
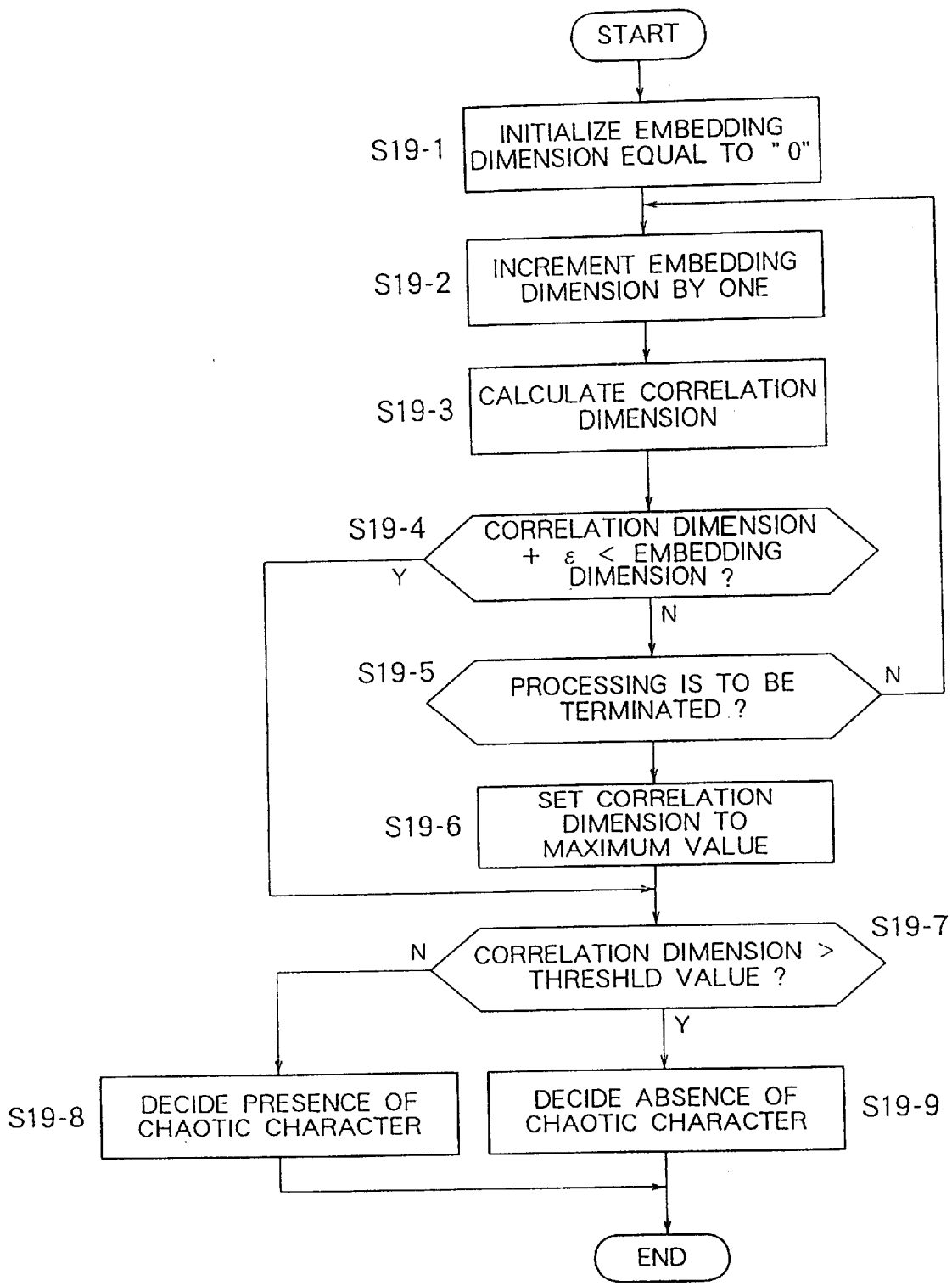
FIG. 19 is a flow chart for illustrating another example of processing executed by the chaotic character decision apparatus.

FIG. 19 illustrates an algorithm of a chaotic character evaluation processing apparatus 100 in which consideration is paid to largeness or smallness of the correlation dimension. In the figure, steps S19-1 to S19-5 are same as the steps S18-1 to S18-4 and the step S18-6. When the processing is terminated without satisfaction of the inequality condition in the step S19-4, the correlation dimension is set to a maximum value in step S19-6. In step S19-7, a decision is made as to whether or not the value of the correlation dimension saturated irrespective of the embedding dimension is greater than the threshold value. Unless the saturation occurs, the maximum value is set for the correlation dimension in the step S19-6.

In the case of the instant embodiment of the invention, it is decided in step S19-8 that the time series signal is of chaotic character when the correlation dimension is small. On the contrary, a decision is made in step S19-9 that the chaotic character is absent when the correlation dimension is large. The threshold value is set at a boundary value with reference to which the decisions for presence and absence of the chaotic character are changed over.

Now, attention is directed to the maximum Lyapunov exponent. The switching processing 1205 shown in FIG. 12 is opened when the largest Lyapunov exponent assumes a large value of plus sign, while the switching processing 1205 is closed when the largest Lyapunov exponent is a small value of plus sign. Incidentally, a method of calculating the largest Lyapunov exponent is disclosed in, for example, "Phys. Rev. Lett., 55" pp. 1082–1085 (1985).

Further, the chaotic character evaluation processing apparatus 100 may also be so implemented as to perform only the prediction for the variation in the sequential data and goodness degree of the prediction, wherein the switching processing 1205 is closed when the prediction is good while it is opened, if otherwise.

Figure 20:
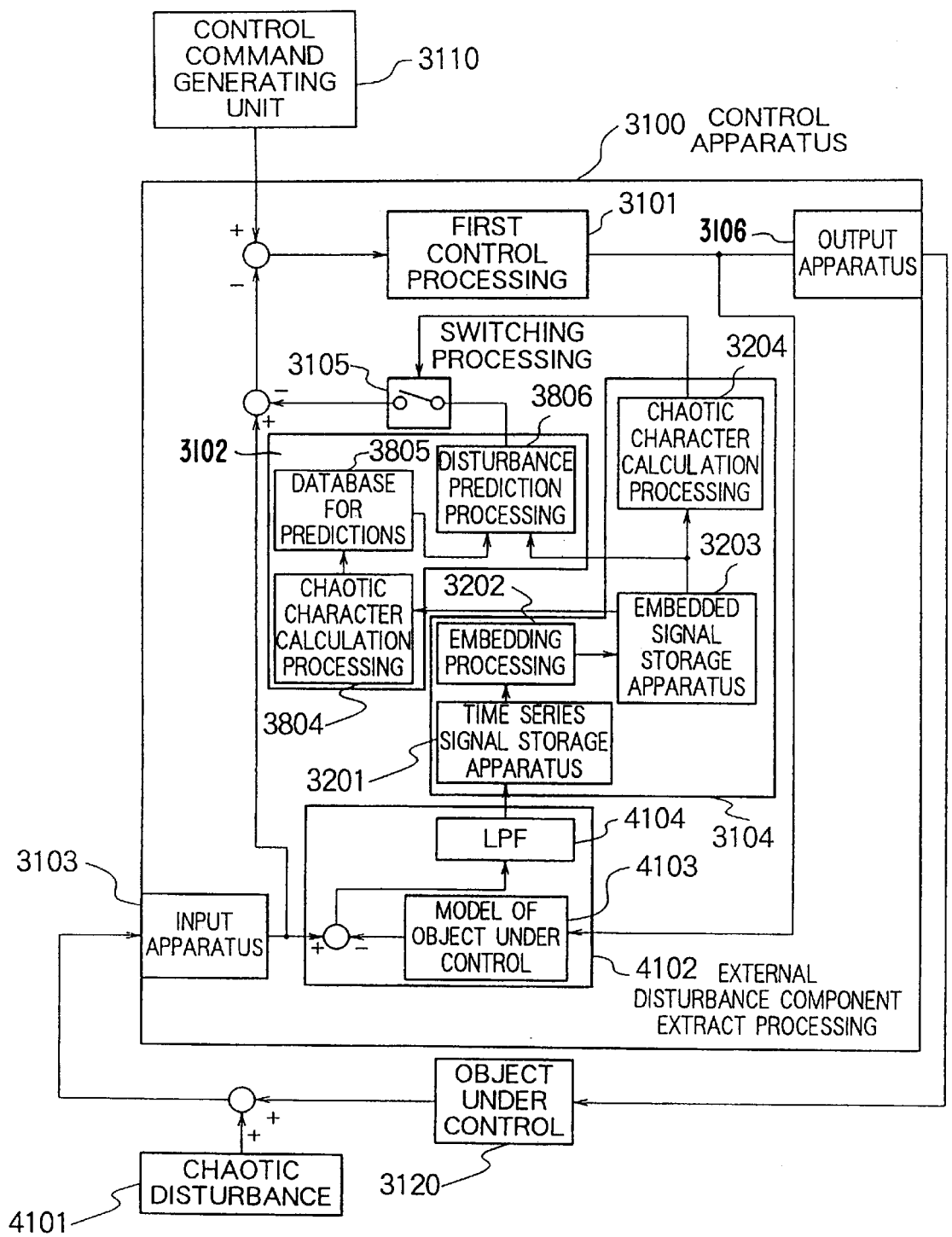
FIG. 20 is a diagram showing an exemplary embodiment of a control apparatus for eliminating chaotic disturbance.

FIG. 20 shows as another example of application of the invention an embodiment which is directed to a control apparatus for controlling an object actually subjected to superposition of chaotic disturbance.

As can be seen in the figure, chaotic disturbance 4101 is superposed on an object 3120 under control. In order to enhance the control accuracy, it is necessary to eliminate the influence of the chaotic disturbance 4101. A control apparatus 3100 is additionally provided with a disturbance component extraction processing 4102 which is designed to extract the disturbance component by eliminating a signal component partaking in intrinsic operation of the object under control from the signal fetched through an input apparatus 3103. In the case of the instant embodiment of the invention, there is provided availably for the external disturbance component extraction processing 4102 a model 4103 of the object under control and a low-pass filter (LPF) 4104. The model 4103 of the object under control incarnates therein input/output dynamics of the object 3120 under control for receiving from a first control processing 3101 a signal similar to that outputted to the object 3120 under control to thereby output a corresponding signal or value. The low-pass filter 4101 may be spared, if it is unnecessary. When the input/output dynamics are known, it may be stored in the form of a transfer function such as given by the expression (13) mentioned below or alternatively it may be stored in the form of a regression formula such as the undermentioned expression (14) when the input/output dynamics are identified from experimentally obtained data by the least square approximation or the like method.

$$Z(t)=6/(1+3S)\cdot Y(t) \tag{13}$$

where

Y(t) represents the input to the model 4103 of the object under control, and

Z(t) represents Laplace operator.

$$Z=A\cdot Y \tag{14}$$

where

Y represents time series vectors in the inputting operation to the model 4103 of the object under control, Z represents time series vectors in outputting, and A represents a transformation matrix.

In the external disturbance component extraction processing 4102, the output from the model 4103 of the object under control made available in this way is subtracted from the output of the input apparatus and subsequently undergoes higher harmonics elimination processing by a low-pass filter 4104 to be finally outputted to the chaotic character evaluation processing 3104.

In this manner, the chaotic disturbance components are extracted from the signal obtained via the input apparatus 3103. The chaotic character evaluation processing 3104 performs the chaotic character decision processing on the chaotic disturbance signal to thereby open or close the switching processing 3105. In this conjunction, the chaotic character calculation processing 3204 performs processing for deciding the chaotic character of the sequential data on the basis of the data stored in the embedded signal storage apparatus through the chaotic character evaluation processing apparatus 100. This processing procedure includes a series of processings corresponding to the bidirectional prediction processing 104 up to the decision processing 109 in the embodiment shown in FIG. 1, while in the case of the embodiment shown in FIG. 7, it includes a series of processings corresponding to the forward prediction processing 110 and the reverse prediction processing 111 up to the decision processing 109. Alternatively, the embodiment shown in FIG. 18 may be employed.

In the second control processing 3102 according to the instant embodiment of the invention, the processing elucidated hereinbefore by reference to FIG. 14 may be adopted. Some of the structural components are shared in common by the chaotic character evaluation processing 3104, wherein the disturbance prediction processing 3806 fetches the reconstructed vectors used for the prediction from the embedded signal storage apparatus 3203 in executing the chaotic character evaluation processing 3104. In this manner, simplification of the configuration as a whole can be realized. As the disturbance prediction processing, there may also be adopted the one described previously by reference to FIG. 17. Furthermore, when the chaotic character evaluation processing 3104 makes decision as to the chaotic character by predicting or forecasting the time series signal as in the case of the embodiments shown in FIGS. 1 and 7, the opening/closing of the switching processing 3105 may be performed by taking into consideration the accuracy of the prediction as well in addition to the result of the evaluation, as described hereinbefore in conjunction with the embodiment shown in FIG. 12. Additionally, the switching processing 3105 may be opened or closed on the basis of largeness/smallness of the correlation dimension and the largest Lyapunov exponent, the accuracy of the prediction and others by paying attention to the degree or significance of the chaotic character. Furthermore, it is equally possible to spare the switching processing 3105 for thereby allowing the output of the second control processing 3102 to remain constantly validated.

The chaotic character calculation processing 3204 and the switching processing 3105 described in the foregoing may be implemented by hardware or by software. Further, although the description has been made on the assumption that the chaotic disturbance 4101 is superposed on the output of the object 3120 under control, it should be appreciated that the chaotic disturbance superposed on the input to the object 3120 under control may equally be eliminated by applying the substantially same concept of the invention. Moreover, in the case of the instant embodiment of the invention, it has been described that the switching processing 3105 is opened or closed depending on the output of the chaotic character decision processing. However, it can equally be conceived to open or close the switching processing 3105 depending on the result of the operation performed by the disturbance prediction processing 3806. In that case, a mean value of distances between the vectors fetched from the embedded signal storage apparatus 3203 and the reconstructed vectors extracted from the database 3805 for predictions which is given by the following expression (15) may be used for the control of the switching processing 3105.

$$K = (1/P) \sum_{i=1}^{P} 1/R_j \qquad (15)$$

More specifically, when the mean value is smaller than a predetermined value inclusive, the switching processing 3105 is closed to validate the output from the second control processing 3102. Otherwise, the switching processing 3105 is opened to invalidate the output of the second control processing 3102. Additionally, when there exist the reconstructed vectors whose similarities to those fetched from the embedded signal storage apparatus 3203 are larger than a predetermined value inclusive, allowing thus the predicted value S to be calculated, the switching processing 3105 may be closed, while opening the switching processing 3105 in the other case.

Moreover, it is equally conceivable to open or close the switching processing 3105 depending on the degree of autocorrelation of the time series signal. In that case, when the autocorrelation is large, the processing may be performed such that the switching processing 3105 is closed, while when the autocorrelation is small, the switching processing 3105 is opened because then the disturbance prediction result is poor in reliability. In this conjunction, for calculating the autocorrelation, there may be adopted an appropriate one of the methods generally known in the art.

Figure 21:
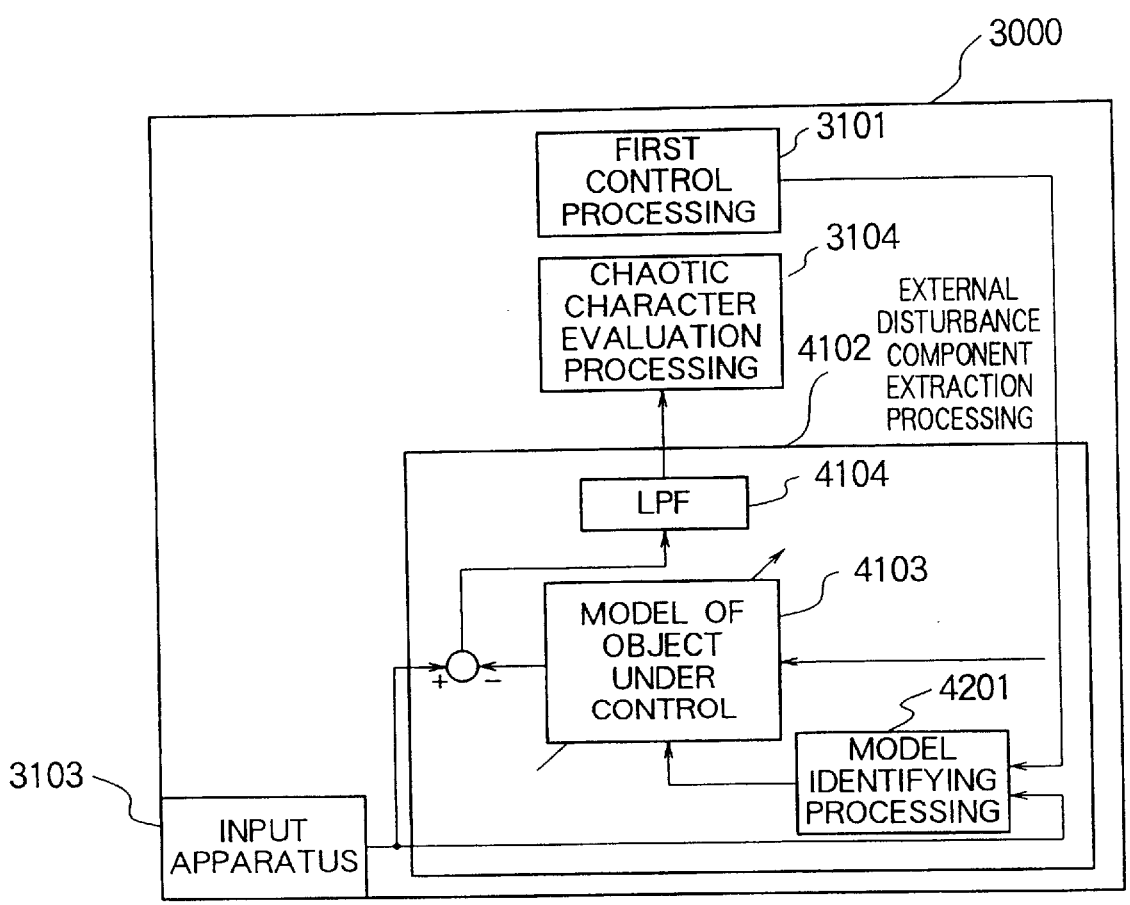
FIG. 21 is a diagram showing a configuration of an exemplary embodiment of the invention for effecting an adaptive modification of a model for an object under control.

FIG. 21 shows an embodiment for identifying a control object model in the disturbance component extraction processing 4102 by learning from the input/output signals of the object 3120 under control. In the figure, a model identifying processing 4201 performs tuning of a model 4103 for the object under control (i.e., control object model) on the basis of the output signal of the first control processing 3101 and the input signal obtained via the input apparatus 3103.

Figure 22:
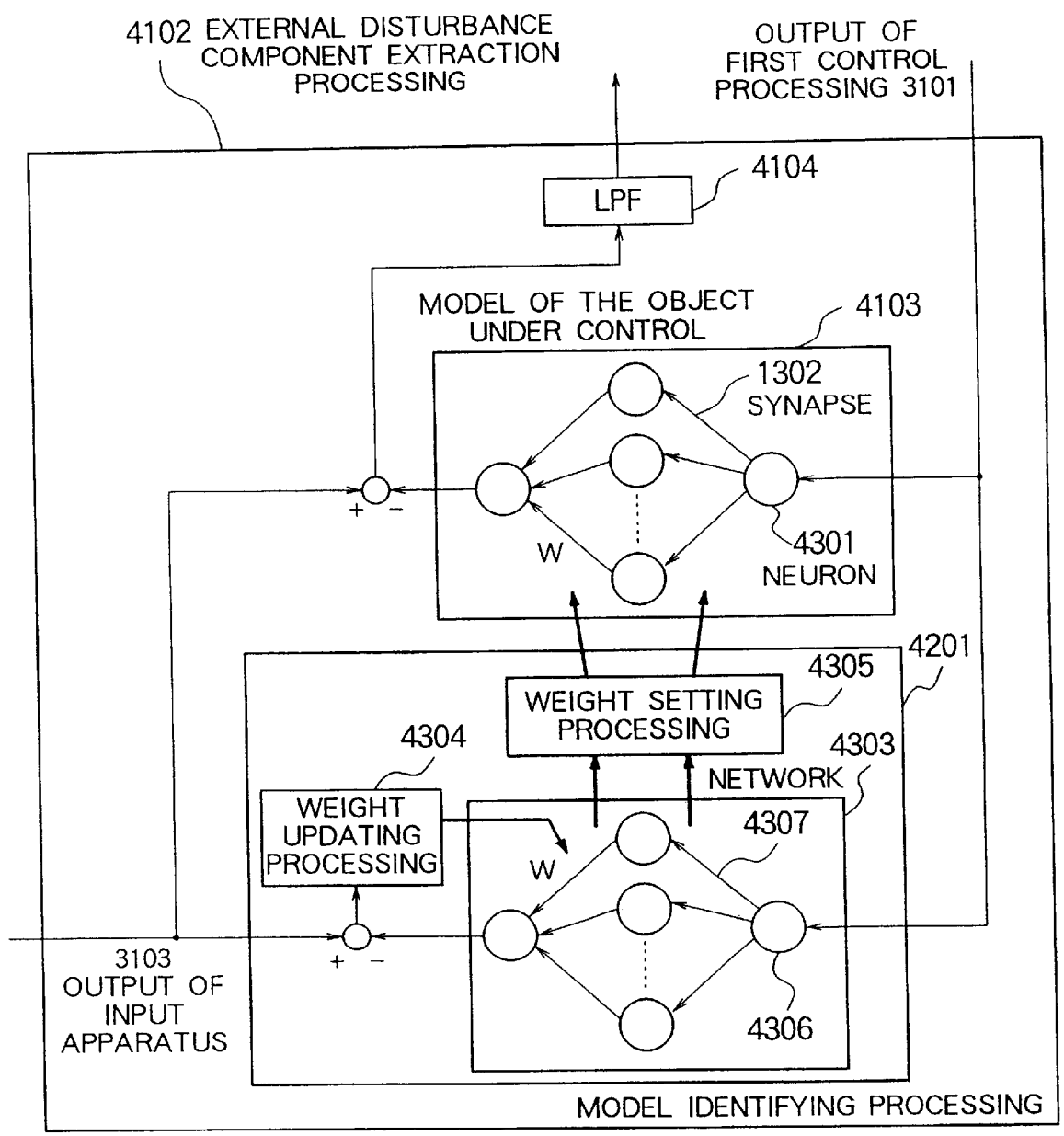
FIG. 22 is a diagram showing a configuration of an exemplary embodiment of the invention for effecting an adaptive modification of a model for an object under control by using a neural network.

FIG. 22 shows a configuration of the model 4103 for the object under control implemented in the form of a neural network and a configuration of the model identifying processing 4201. In the case of the instant embodiment of the invention, the model 4103 of the object under control is implemented in the form of a network configuration in which a plurality of neurons 4301 are coupled to one another by synapses 4302 in a layer-like structure. On the other hand, the model identifying processing 4201 performs operation for determining weights for the synapses 4302. Since the processings for the operation and the learning performed by the neural network are disclosed in many literatures circulated publicly, any further explanation in this respect will be unnecessary.

In FIG. 22, the model identifying processing 4201 is comprised of a network 4303 implemented in a configuration similar to that of the model 4103 of the object under control, a weight updating processing 4304 for determining weights w of the synapses 4307 by learning and a weight setting processing 4305 for transferring the weight values w obtained by learning to the model of the object under control, whereby the weights w are set at the corresponding synapses. The network 4303 receives as the input signals the values transferred from the first control processing 3101 to the control object model 3120, to thereby output a result of the operation. A weight updating processing 4304 updates the weight values of the synapses 4307 on the basis of a value derived by subtracting the above-mentioned output value from the output of the input apparatus 3103 so that the output of the network 4303 coincides with the output of the input apparatus 3103. The weight value at each synapse as obtained after repetition of this operation a predetermined number of times is set at each of the synapses of the model 4103 for the object under control through the weight setting processing 4305. The model identifying processing 4201 may be executed sequentially during the control or alternatively in precedence to the start of the control as a preprocessing. In the case of the instant embodiment of the invention, the prediction-dedicated database generating processing 3804 is activated after the model 4103 for the object under control has definitely been identified or established, whereupon the database 3805 for predictions is generated.

Figure 23:
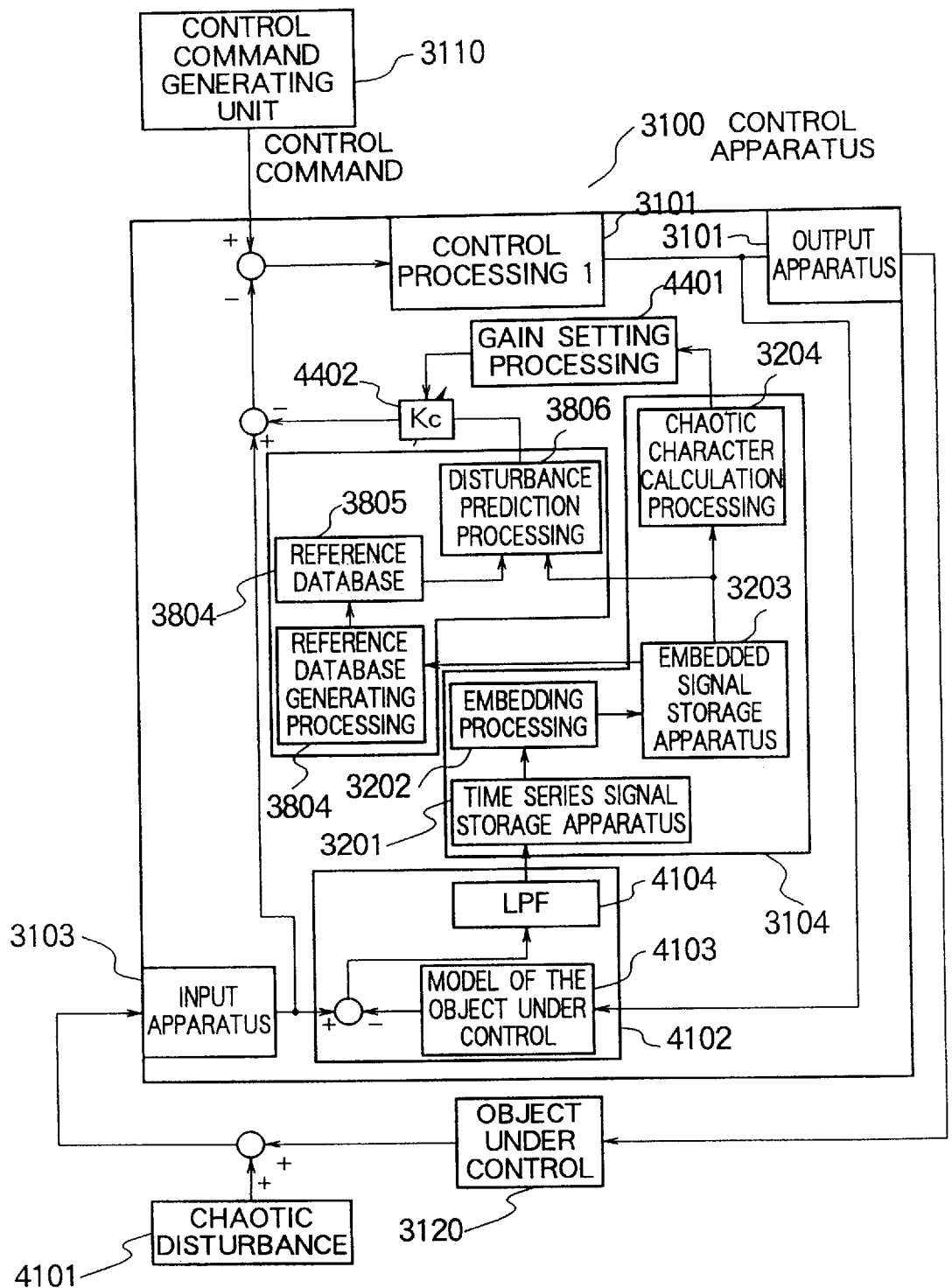
FIG. 23 is a diagram showing a configuration of a control apparatus for effecting a gain tuning by using the result of chaotic character decision.

FIG. 23 shows an embodiment in which the switching processing 3105 shown in FIG. 20 is replaced by a gain 4402. A gain setting processing 4401 serves to set the gain 4402 at an appropriate value in accordance with the degree of the chaotic character determined by quantifying of the result of operation performed by the chaotic character calculation processing 3204. In this conjunction, correspondence between the largest Lyapunov exponent and the degree of the chaotic character may be monitored to decrease $K_c$ of the gain 4402 as the value of the largest Lyapunov exponent increases and vice versa, by way of example. Alternatively, correspondence between the degree of the correlation dimension and that of the chaotic character or correspondence between the goodness degree of prediction for variation of the sequential data and the degree of the chaotic character may be monitored.

Figure 24:
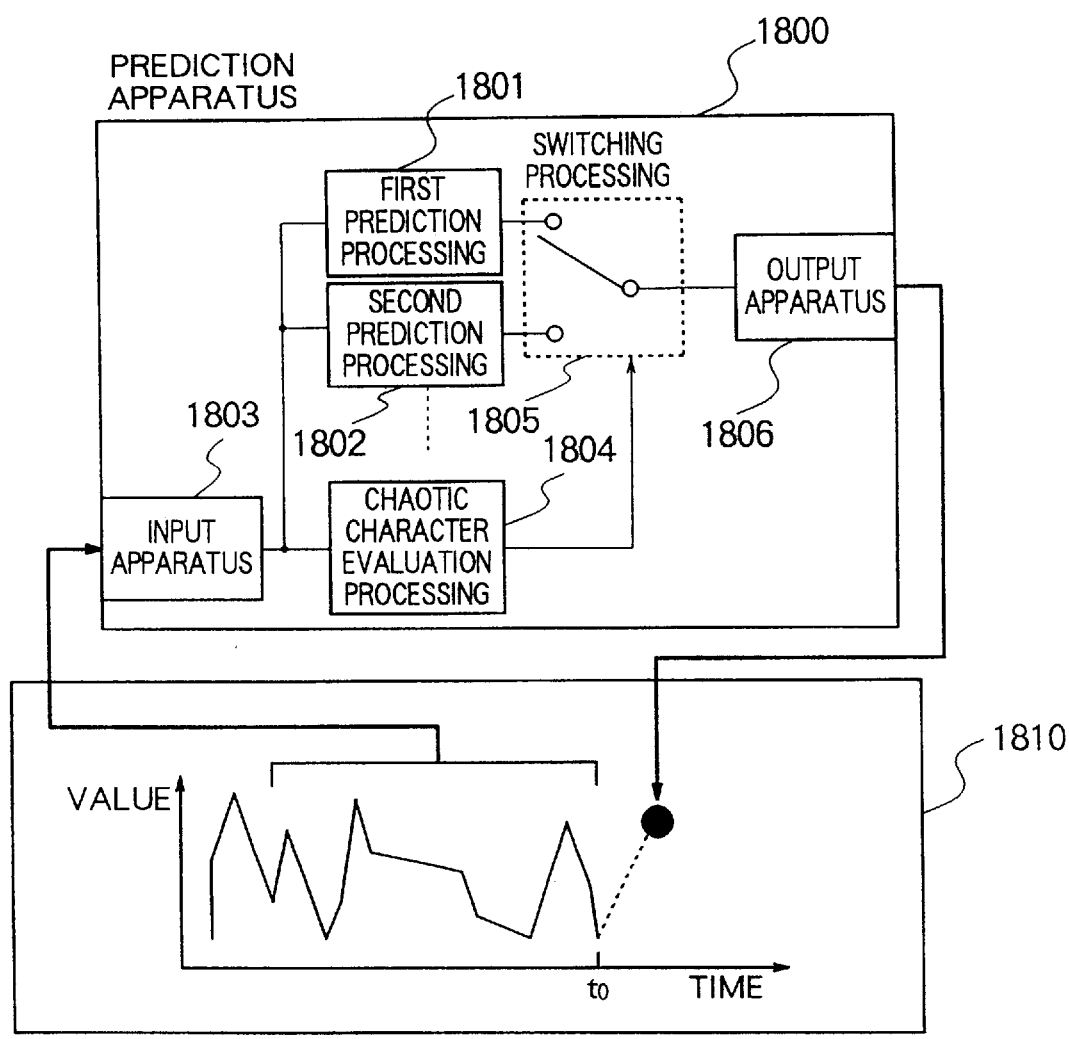
FIG. 24 is a diagram showing a prediction apparatus according to another embodiment of the invention.

FIG. 24 shows a prediction apparatus for a time series signal according to another embodiment of the invention.

Referring to the figure, the prediction apparatus 1800 is comprised of a first prediction processing 1801, a second prediction processing 1802, an input apparatus 1803 for receiving a time series signal, a chaotic character evaluation processing 1804 for deciding the chaotic character of the time series signal as inputted, a switching processing 1805 for switching the prediction processing on the basis of the result of the chaotic character evaluation, and an output apparatus 1806 for outputting the result of operation carried out by the prediction processing validated through the switching processing 1805.

As the chaotic character evaluation processing 1804, the various decision processings described above in conjunction with the embodiments shown in FIGS. 12 and 20 can be adopted. However, the evaluation processing based on the prediction should preferably be employed particularly in the case of the instant embodiment. Further, when the first prediction processing 1801 is to be so implemented as to perform a short-term chaos prediction, by way of example, the configuration shown in FIG. 14 may be adopted as it is. Further, the time series signal storage apparatus 1401, the embedding processing 1402 and the embedded signal storage apparatus 1403 shown in FIG. 14 may be implemented in common to the corresponding apparatus 101, 102 and 103, respectively, in the chaotic character evaluation processing 100 with the processing 1404 for generation of the database 1405 for predictions being spared, wherein the disturbance prediction processing may be realized in the same manner as illustrated in the flow chart of FIG. 17.

According to the teachings of the invention in the instant embodiment, a prediction by autoregressive linear model is adopted for the second prediction processing 1802. Assuming that $\xi_{N+1}$ is to be predicted from the closest time series signal ($\xi_1, \xi_2, \ldots, \xi_N$), the second prediction processing 1802 performs an operation in accordance with a linear expression mentioned below:

$$\xi_{N+1} = a_1\xi_1 + a_2\xi_2 + \ldots + a_N\xi_N \qquad (16)$$

where $a_1$ to $a_N$ represent constants, respectively.

The value $\xi_{N+1}$ obtained as the result of the calculation is outputted to the switching processing 1805. When presence of the chaotic character in the time series signal is decided, the switching processing 1805 outputs the result of the short-term chaos prediction executed by the first prediction processing 1801 to the output apparatus 1806. On the other hand, when absence of the chaotic character is decided, the result of the prediction made by the autoregressive linear model as calculated in accordance with the expression (16) is outputted to the output apparatus 1806. As the other processings which the prediction apparatus 1800 is to be equipped with, there may be conceived a variety of processings such as the non-linear prediction processing effected by using a neural network and others. In this conjunction, it should be mentioned that modifications of the prediction processing as well as addition of other processings such as those mentioned above can readily be realized, as occasions require.

Figure 25:
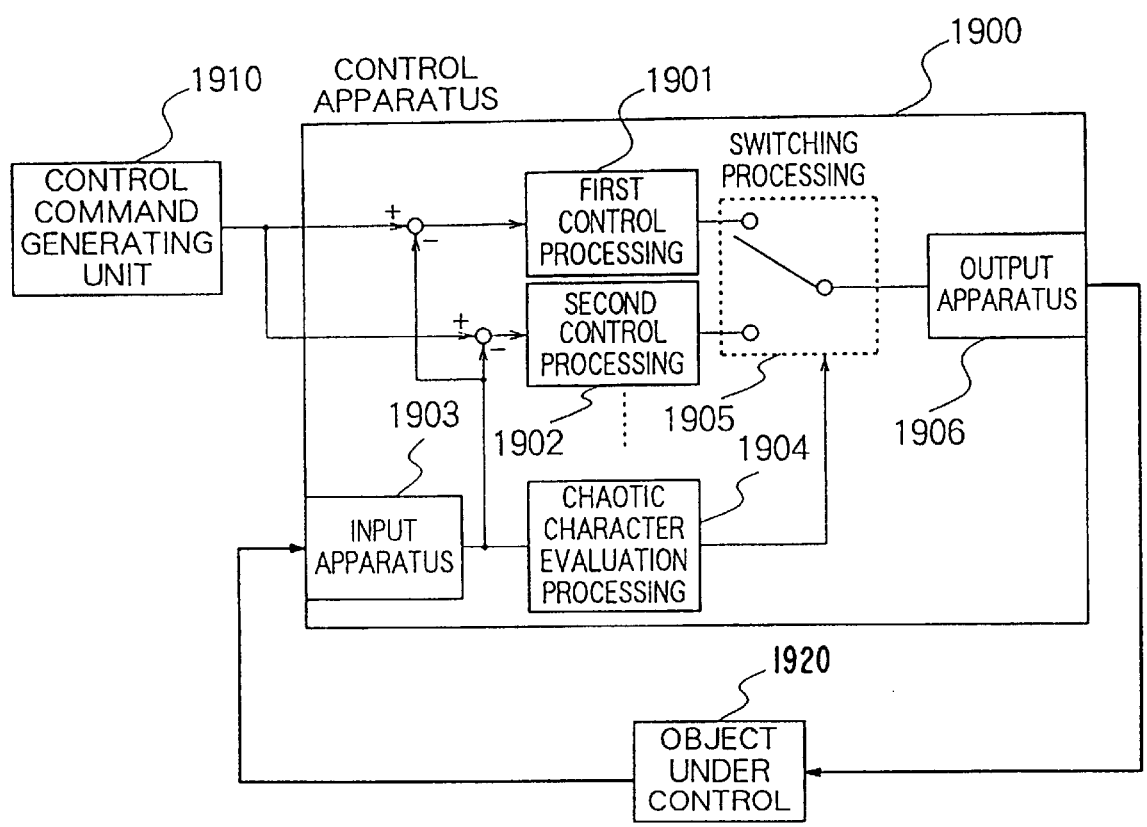
FIG. 25 is a diagram showing a configuration of a control apparatus to which the present invention is applied.

FIG. 25 shows a control apparatus to which the invention is applied and in which a control processing is switched or changed over in dependence on the results of the chaotic character evaluation. The control apparatus 1900 receives a signal fed back from an object 1920 under control with an input apparatus 1903 to control a switching processing 1905 in accordance with the decision result of the chaotic character evaluation processing. A first control processing 1901 and a second control processing 1902 are supplied with a signal derived by subtracting the signal received via the input apparatus 1903 from a signal delivered from a control command generating unit 1910, to thereby output the signals representing the results of operations for the control to the switching processing 1905, which in turn selects the valid one to be transferred to an output apparatus 1906 and hence to the object 1920 under control. As the control processing now of concern, there may be enumerated a variety of controls such as a PID control system, a PD control system, an optimal control system and the like in dependence on the types of the object under control. For the chaotic character evaluation processing 1904, there may be adopted a variety of decision or evaluation processings such as those described hereinbefore in conjunction with the embodiments shown in FIGS. 12 and 20.

Figure 26:
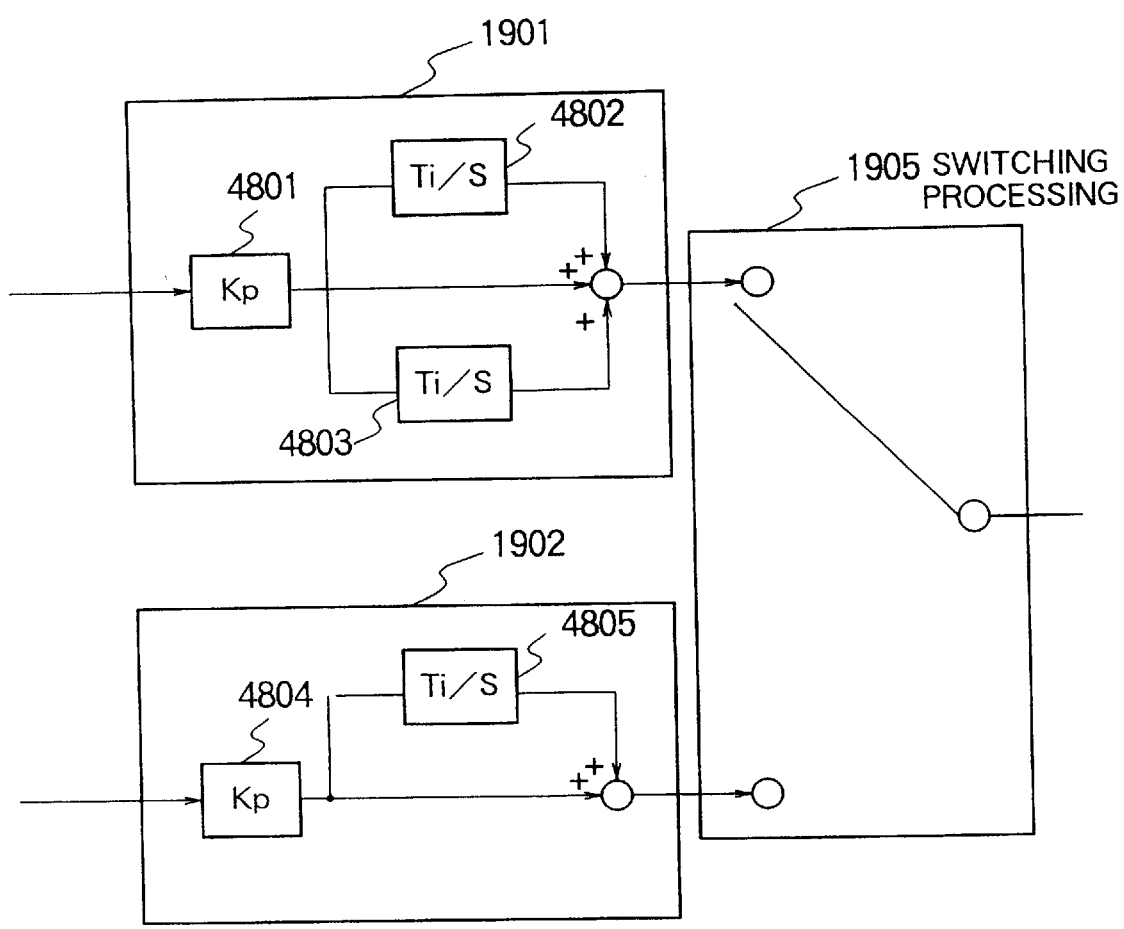
FIG. 26 is a diagram for illustrating a configuration of a switching processing according to an exemplary embodiment of the present invention.

FIG. 26 shows configurations of the first control processing 1901 and the second control processing 1902 in the application illustrated in FIG. 25 on the assumption that the first control processing 1901 is realized by a PID control system with the second control processing 1902 realized by a PI control system and that operation of each of the control components is similar to that described previously by reference to FIG. 13. When presence of the chaotic character in the time series signal is decided, the output of the PID control system is produced from the control apparatus 1900 via the switching processing 1905 while the output of the PI control system is produced from the control apparatus 1900 via the switching processing 1905 when it is decided that the time series signal lacks chaotic character. As the control processing, various control processings such as optimal control system and others may be conceived in addition to the PID control and the PI control.

Figure 27:
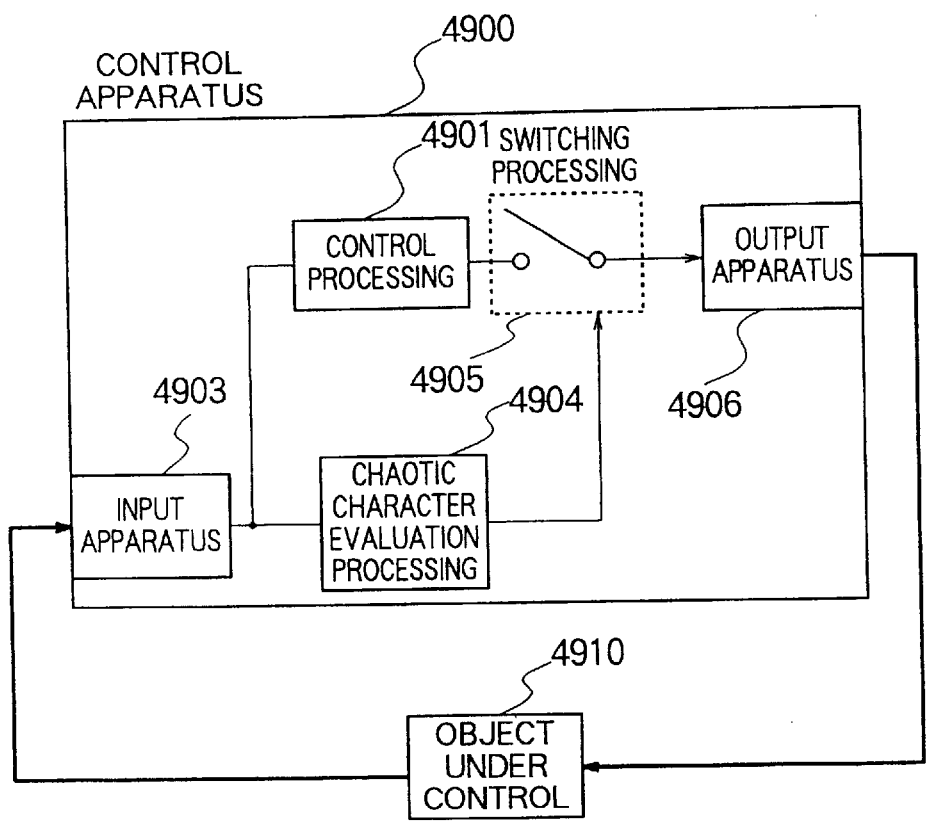
FIG. 27 is a diagram showing a configuration of another exemplary embodiment of the present invention applied to a control apparatus.

FIG. 27 shows an embodiment of the invention which is arranged to selectively output a control or manipulation quantity to an object under control depending on the result of decision regarding the presence or absence of the chaotic character in the time series signal received from the object under control. Referring to the figure, the chaotic character evaluation processing 4904 may be realized by using a given one of the various decision or evaluation processings described hereinbefore in conjunction with the exemplary embodiments by reference to FIGS. 12 and 20. Depending on the result of the decision made by the chaotic character evaluation processing 4904, the switching processing 4905 validates or invalidates the output of the control processing 4901 to thereby place the object 4910 in the controlled state or control-free state. The type of the operation performed by the control processing 4901 may be selected appropriately so long as a command proper to the object under control can be delivered. Thus, there may be employed a variety of control processings such as the PID control illustrated in FIG. 26 and others.

Figure 28:
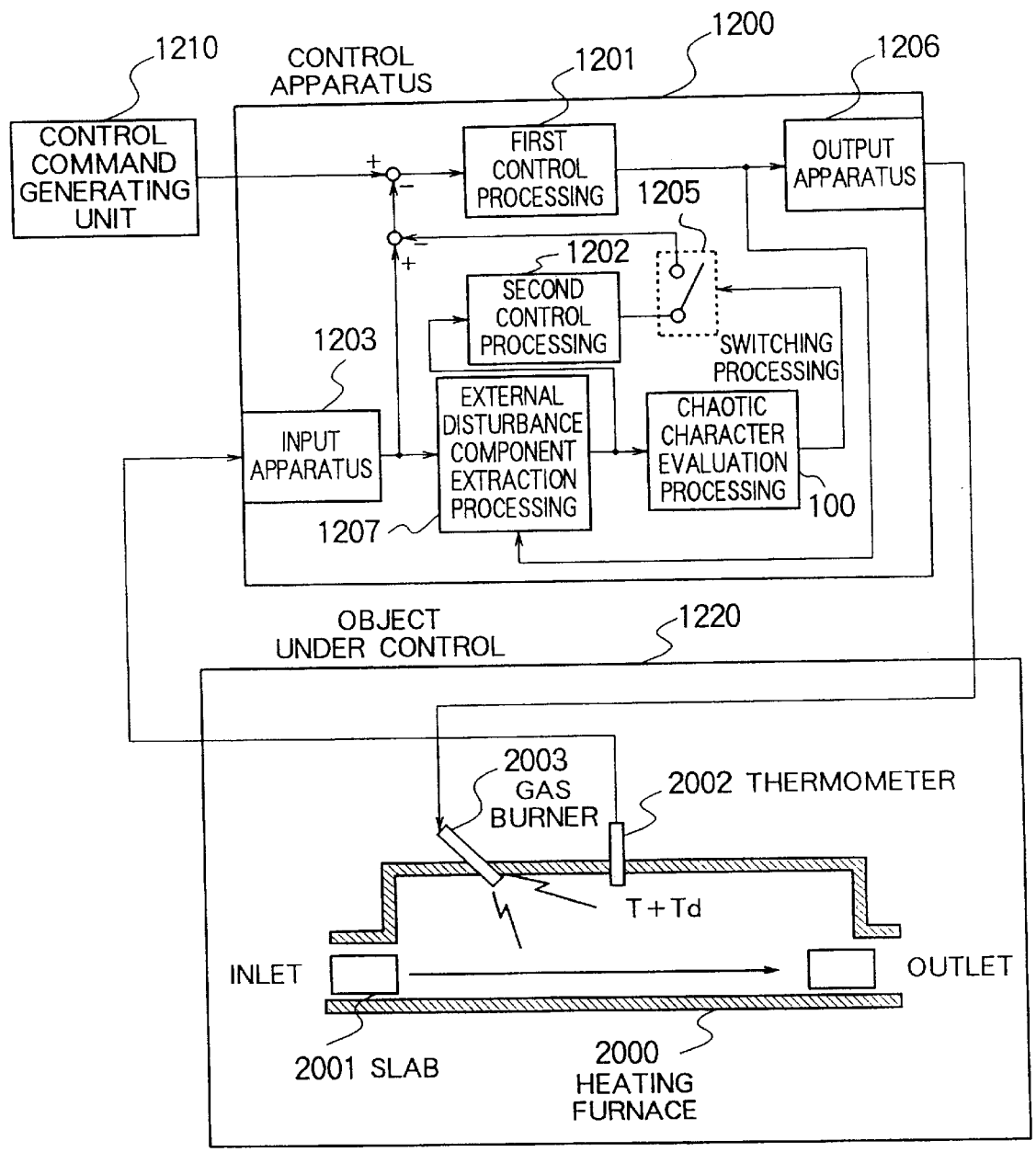
FIG. 28 is a diagram showing a structure of a heating furnace plant to which the present invention is applied.

FIG. 28 shows a heating furnace plant for raising the temperature of a steel material in a hot rolling line as an example of the object 1220 under control.

Referring to the figure, a heating furnace 2000 is maintained at a high temperature state by a gas burner 2003. A slab (steel material) 2001 inserted into an inlet opening is heated in the atmosphere of a high temperature to be fed out through an exit port. A control apparatus 1200 detects the temperature within the heating furnace 2000 by means of a thermometer 2002 and via an input apparatus 1203 to thereby determine a flow rate of a fuel to be fed to the gas burner 2003 on the basis of the detected temperature value and a command temperature value, wherein a signal indicating the fuel flow rate as determined is outputted by means of an output apparatus 1206. In this connection, it is to be noted that the value detected by the thermometer 2002 represents a temperature T to be intrinsically detected which is superposed with a chaotic fluctuation Td attributable to the heat convection. Microscopically, the chaotic fluctuation takes place due to interaction of molecules with a certain regularity and additionally interaction of the molecules with furnace walls and air inlet/outlet portions, whereby the effect depends on the interior geometrical factors of the furnace and others.

In any case, when the control quantity is determined on the basis of the fetched temperature (T+Td), the fuel flow rate as determined will contain the influence of the fluctuation Td, which results in variation in the temperature of the heating furnace 2000. As a consequence, the temperature of the slab 2001 may undergo fluctuation, involving deviations from the desired temperature. Under the circumstances, there exists a necessity of determining the fuel flow rate on the basis of the value from which the influence of fluctuation Td is eliminated, in order to control the temperature with high accuracy. At this juncture, it is known that even when the dynamic systems giving rise to generation of chaos is of p dimensions whereas the detectable signal is of one dimension, characteristic behavior of the dynamic systems can be reproduced by reconstructing a high dimensional space through the embedding processing.

Thus, in the case of the instant embodiment of the invention, the nature or character of the chaos of the data can be reconstructed through the embedding process, to allow a short-term prediction to be realized.

The control apparatus 1200 corresponds to a simplified depiction of the control apparatus 3100 shown in FIG. 20. The input apparatus 1203 of the control apparatus 1200 fetches the temperature (T+Td) of the heating furnace 2000 from the thermometer 2002. Through the disturbance component extraction processing 1207, the disturbance component(s) Td is extracted, whereby presence or absence of the chaotic character of the disturbance components Td stored time-serially can be decided through the chaotic character evaluation processing 100. Depending on the result of this decision processing, the switching processing 1205 is turned on or off. The second control processing 1202 is designed to predict the value of the disturbance Td from one time point to the next on the basis of the disturbance components stored in the time series. In case the behavior of the time series of the disturbance Td is chaotic, the value of the disturbance Td as predicted is eliminated from the signal inputted via the input apparatus 1203. The value resulting from this processing is regarded as the essentially intrinsic feedback signal from the object 1220 under control, whereby the result of the arithmetic operation performed by the first control processing on the deviation from the control command is delivered to the object 1220 under control.

More specifically, the control or manipulation quantity can be calculated as the flow rate value of the fuel sent to, for example, the gas burner 2003. Through the processing procedure described above, high-accuracy control which is not susceptible to the influence of the chaotic disturbance contained in the detected temperature can be ensured.

Figure 29:
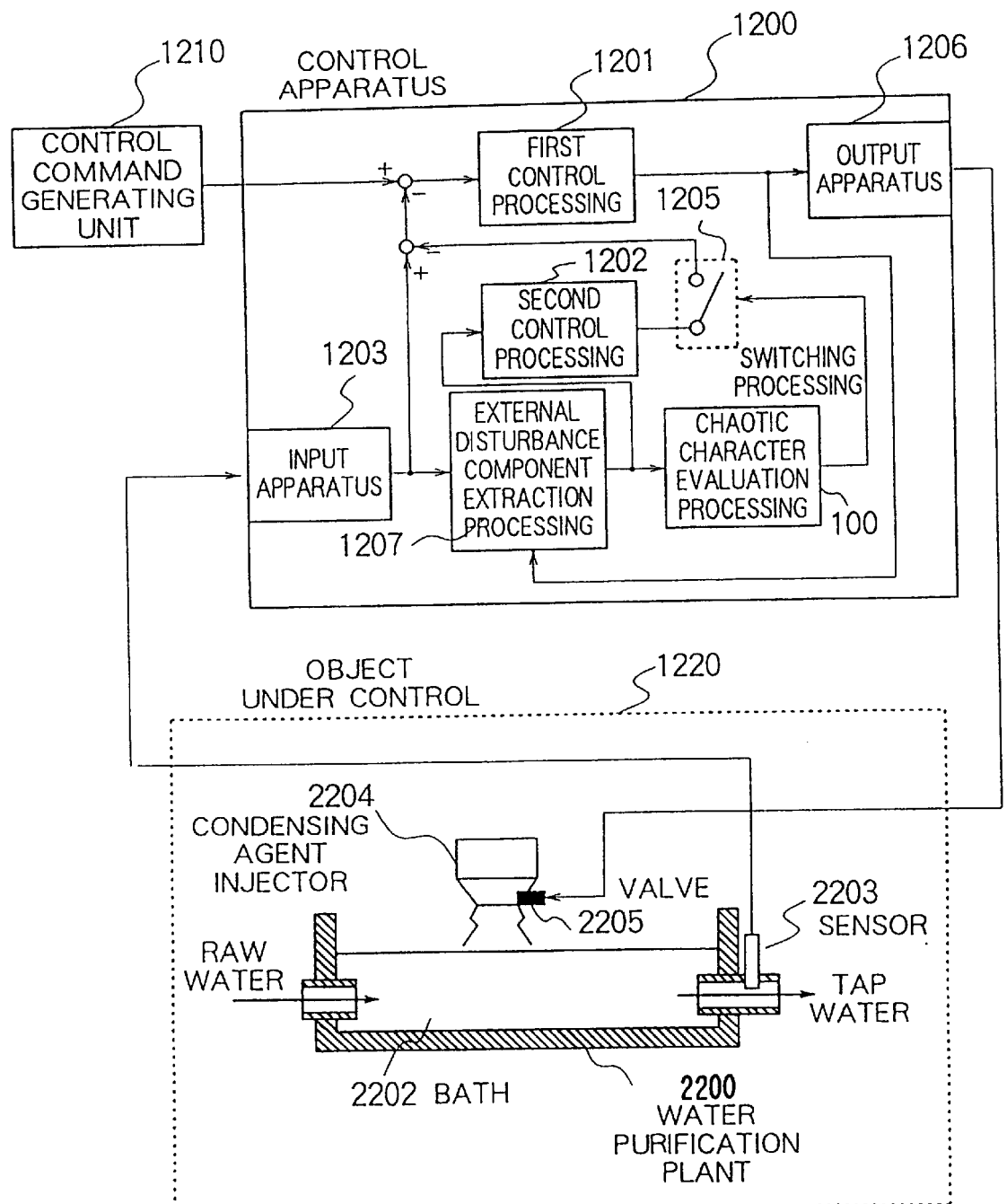
FIG. 29 is a diagram showing a configuration of a water purification control to which the present invention is applied.

FIG. 29 shows an application of the invention to a water purification system which is subjected to the control.

The water purification plant 2200 is a system for injecting an appropriate amount of a condensing agent to raw water from a river or lake to thereby prepare service or tap water. The control apparatus 1200 detects the degree of purification of water through the medium of a sensor 2203, to thereby output a signal for controlling a valve 2205 by way of the output apparatus 1206 for determining the amount of the condensing agent. In this conjunction, it will be appreciated that the value detected by the sensor 2203 is superposed with chaotic disturbance ascribable to fluctuation in the purity of water. As the causes for the fluctuation, there may be mentioned microscopical interaction of water molecules having a regularity, vortexes generated thereby, nonuniform injection of the condensing agent and the like as well as geometrical plant configuration. In this case, the signal processing similar to that of the embodiment described previously in conjunction with the embodiment shown in FIG. 28 is carried out. With the arrangement of the instant embodiment of the invention, the water quality can uniformly be controlled at or in the vicinity of a desired level with high accuracy.

Figure 30:
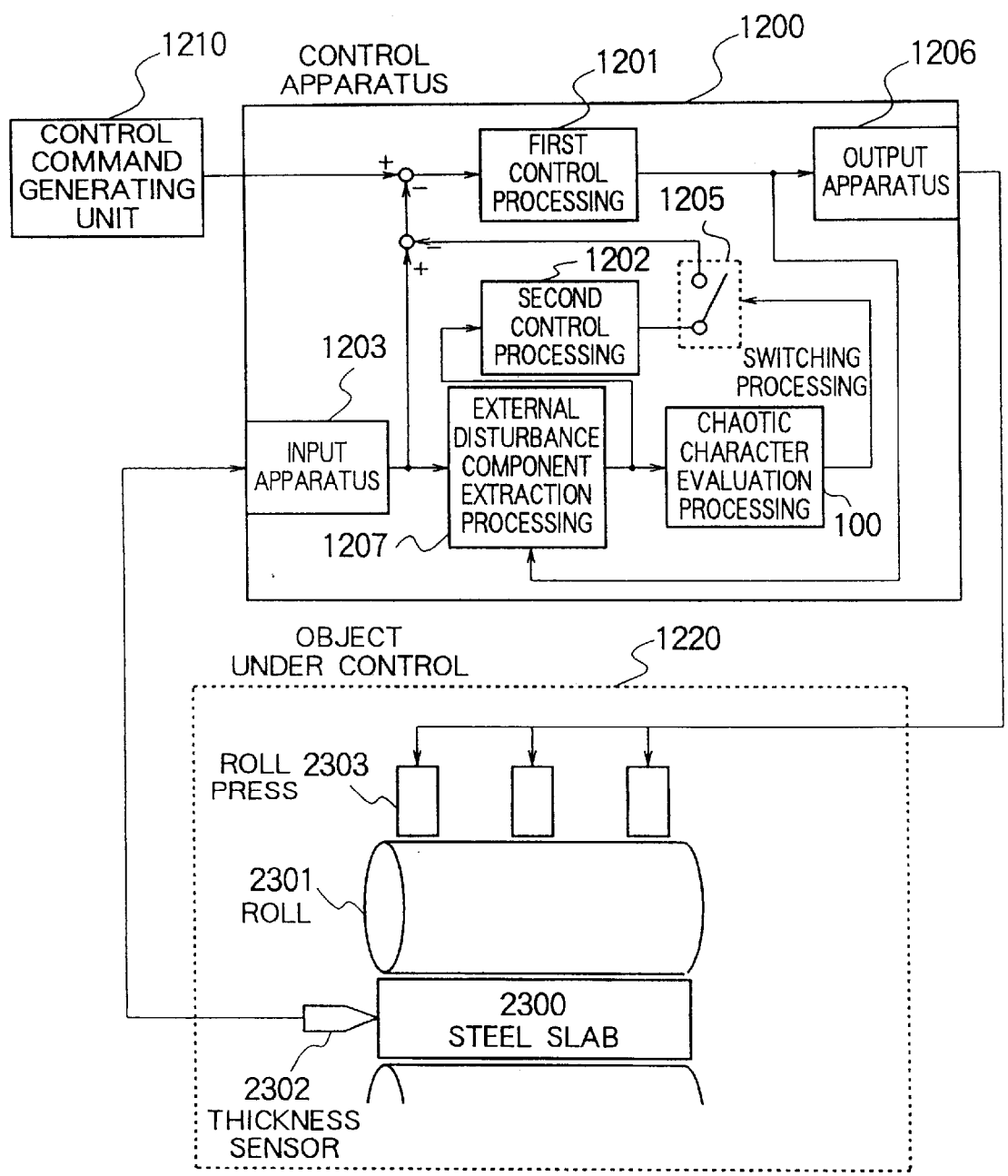
FIG. 30 is a diagram showing a roll mill control arrangement to which the present invention is applied.

FIG. 30 shows, by way of example, a roll mill system as the object 1220 for control.

Referring to the figure, a steel slab 2300 undergoes rolling operation between rolls 2301. A control apparatus 1200 detects the thickness of the steel slab 2300 via a thickness sensor 2302 and an input apparatus 1203. On the basis of the thickness as detected, the control apparatus 1200 determines a control quantity which is outputted to a roll press 2303 applying a rolling pressure to the rolls 2301 via an output apparatus 1206. In this conjunction, it is to be noted that the value detected from the thickness sensor 2302 is superposed with a chaotic disturbance which is attributable to dynamic wearing of the rolls 2301 and non-uniformity of the steel material. In this case, by applying a signal processing method similar to that described previously by reference to FIG. 28, the thickness of the finished product can be made uniform at a value at least approximating a desired value. In other words, accuracy of the thickness control can be enhanced.

In the case of the embodiments described above, the result of the chaotic character evaluation is reflected onto the control rather straightforwardly. It should however be noted that the result of the chaotic character evaluation may simply be displayed to thereby leave the control based on the evaluation to discretion of the operator.

Figure 31A:
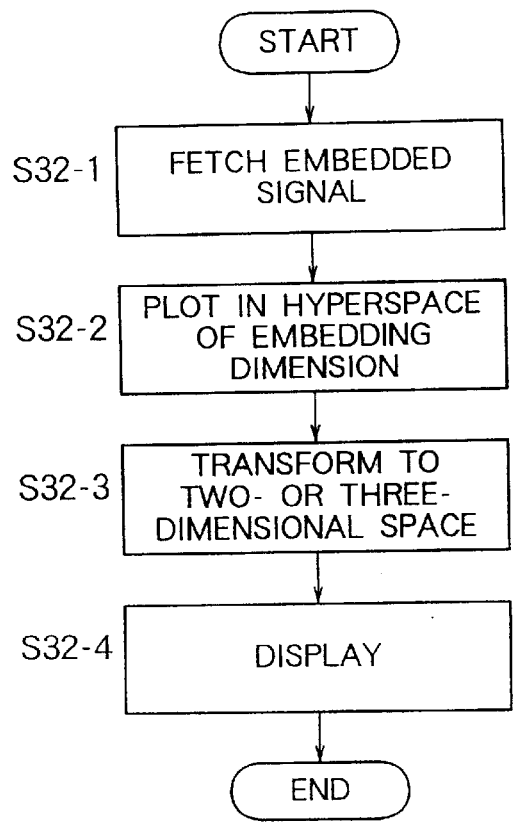
FIGS. 31A and 31B are flow charts for illustrating processings executed by an embedded signal display apparatus.
Figure 31B:
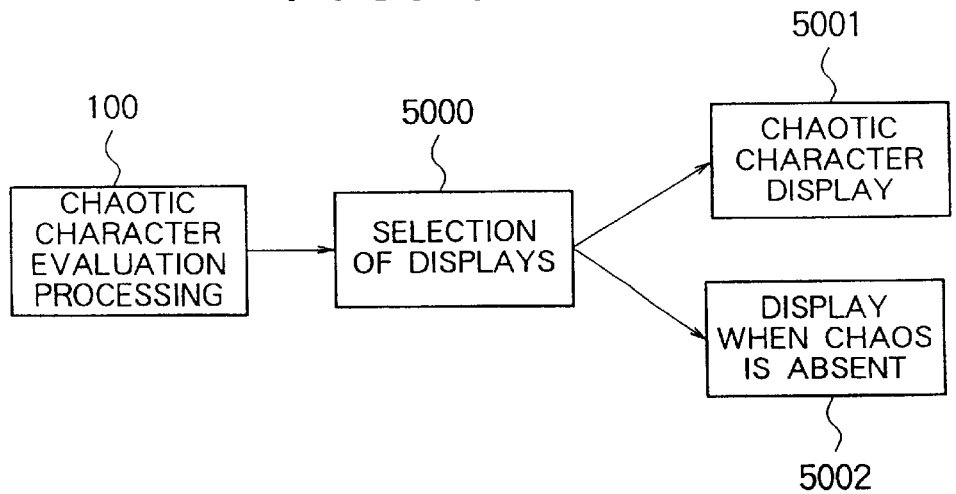

FIGS. 31A and 31B show two examples of chaotic character display processing, respectively. More specifically, FIG. 31A is a flow chart for illustrating a processing which makes it possible to generate a display reflecting the degree chaotic character, and FIG. 31B is a flow chart illustrating a processing for displaying only presence or absence of the chaotic character. Referring to FIG. 31A, the embedded signal is fetched in a step S31-1 and plotted in a m-dimensional hyperspace corresponding to the embedding dimension m in a step S31-2. When m is greater than "3", transformation to a two-dimensional or three-dimensional space is performed in a step S31-3 which is followed by generation of display in a step S31-4. On the other hand, in the case of the processing shown in FIG. 31B, the result obtained through the chaotic character decision processing 100 is evaluated in a display select step 5000, whereby a chaos indicating display 5001 is selected when the chaotic character is determined and, if otherwise, a display 5002 indicating absence of the chaotic character (which can be set rather arbitrarily) is selected.

Figure 32A:
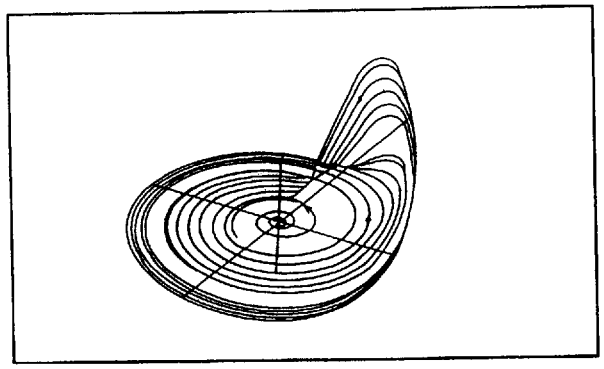
FIGS. 32A and 32B are diagrams showing examples of generated display, respectively.
Figure 32B:
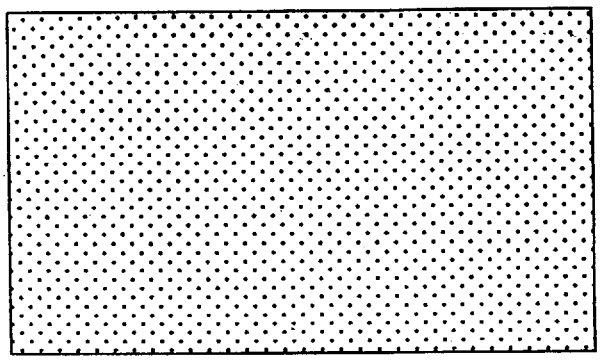

FIGS. 32A and 32B show exemplary displays. To be more concrete, FIG. 32A shows an example of a display indicating chaos when the embedding dimension is "3", and FIG. 32B shows an exemplary display indicating the absence of chaos. Since the display in which the degree of chaotic character is taken into account can be displayed through the processing illustrated in FIG. 31A, it is possible to change, for example, the size of the display shown in FIG. 32A, in correspondence to the degree of the chaotic character.

Figure 33:
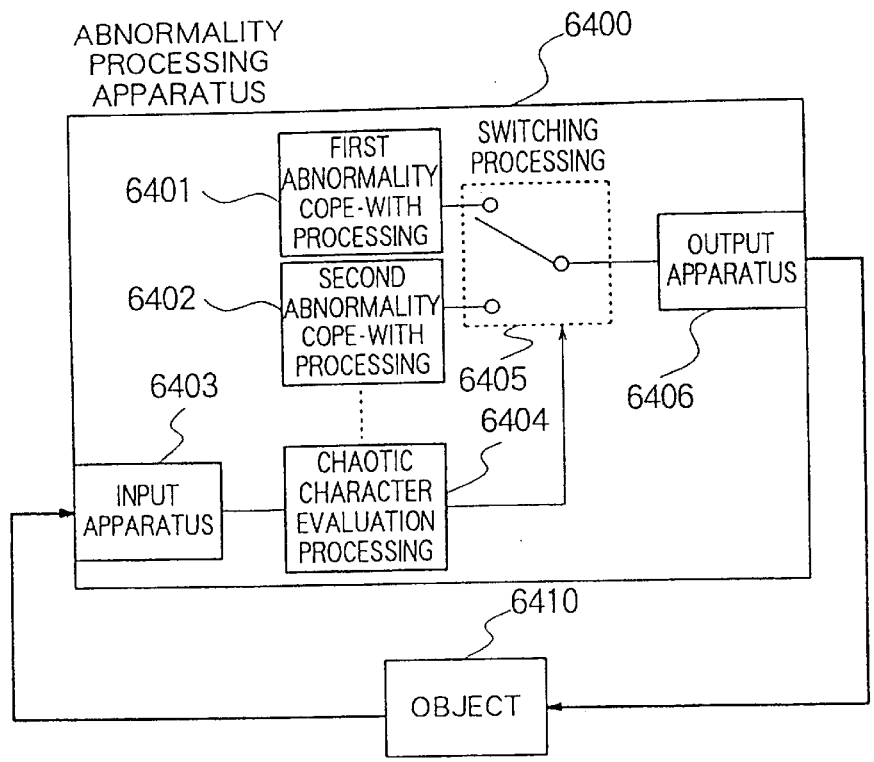
FIG. 33 is a diagram showing an abnormality processing apparatus to which the present invention is applied.

FIG. 33 shows an embodiment of the invention which is applied to an abnormality processing apparatus. In the case of the instant embodiment, the abnormality processing apparatus 6400 incorporates therein a plurality of anti-abnormality processings which are designed to select and execute appropriate processings depending on the results of decision as to the chaotic character of a time series signal delivered from an object 6410 under control, whereon the result of the execution is outputted to the object 6410 through an output apparatus 6406. Correspondence relation between the result of the chaotic character evaluation and the abnormality of the object 6410 may be established on the basis of the value of the correlation dimension determined through the processing described hereinbefore by reference to FIG. 18. In the nuclear power plant, it is known that lowering in the correlation dimension bears a correspondence to degradation in the system stability. Accordingly, in the case of applications of this kind, it is conceivable to activate the anti-abnormality processing in response to lowering of the correlation dimension and select the anti-abnormality processing to be activated in dependence on the value of the correlation dimension. By way of example, a first anti-abnormality processing may be designed to shut down the system, while a second anti-abnormality processing may be designed to activate an alarm lamp, so that when the correlation dimension becomes smaller than "2", the first anti-abnormality processing is activated and when the correlation dimension lies within a value range of "2" to "4", the alarm lamp is lit. On the other hand, when the correlation dimension is greater than "4", the system is decided as operating in a normal state and the anti-abnormality processing is inhibited from activation.

Figure 34:
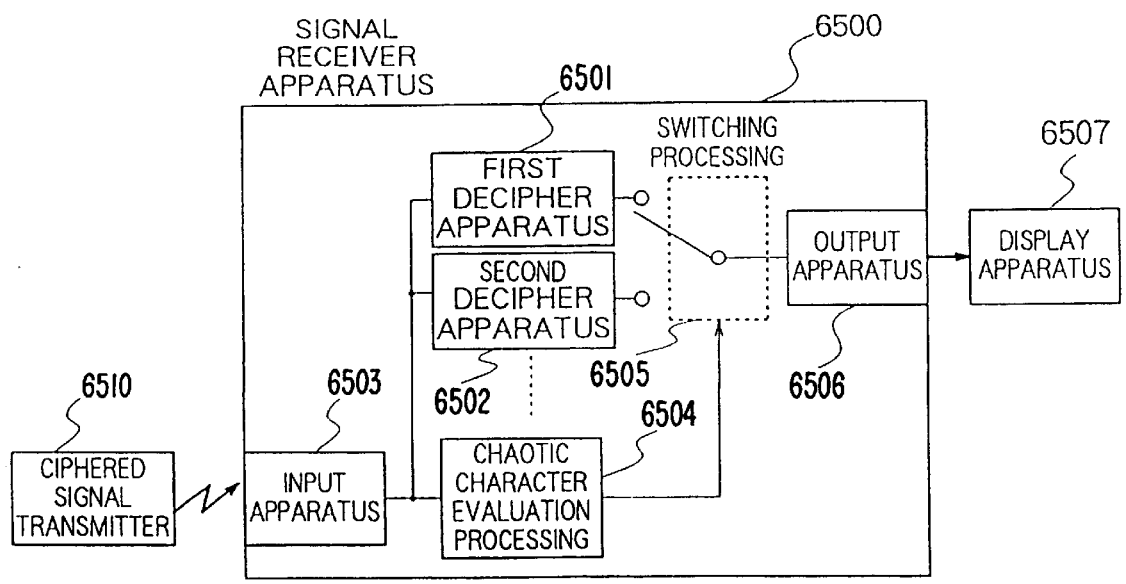
FIG. 34 is a diagram showing a cipher processing apparatus to which the present invention is applied.

FIG. 34 shows an exemplary embodiment of the invention applied to a signal receiver apparatus. Referring to a figure, the signal receiver apparatus 6500 is comprised of plural decipher apparatuses including a first decipher apparatus 6501 and a second decipher apparatus 6502, a receiver apparatus 6503 for receiving signals sent from a ciphered signal transmitter 6510, a chaotic character evaluation processing 6504, a switching processing module 6505 for selecting the decipher means in accordance with the result of the chaotic character evaluation, an output apparatus 6507 for outputting clear data resulting from the deciphering, and a display apparatus 6507 for displaying the result as outputted. According to the instant embodiment of the invention, each of time series data as received which are represented by $$\xi_1, \xi_2, \ldots, \xi_t, \ldots \quad (17)$$

undergoes deciphering processing performed by the first deciphering apparatus 6501, which can be given by $$\Xi_t = \xi_t - A_t \quad (18)$$

where
$A_t = 4A_{t-1} \cdot (1 - A_{t-1})$
$A_1 = 0.5$
for thereby regenerating time series signals given by $$\Xi_1, \Xi_2, \ldots, \Xi_t \ldots \quad (19)$$

Similarly, the second deciphering apparatus 6502 performs the processing which can be represented by the following expression to determine reproduced signals.

$$\Xi_t = \xi_t - B_t \quad (20)$$

where
$B_t = 10 \cdot (-B_{t-1} + C_{t-1})$
$B_1 = 0.0$
$C_t = -B_{t-1} \cdot D_{t-1} + 28B_{t-1} - C_{t-1}$
$C_1 = 0.1$
$D_t = -B_{t-1} \cdot C_{t-1} - (8/3) \cdot D_{t-1}$
$D_1 = 0.0$ The result of the decipher processing to be validated is selected by the switching processing 6505 on the basis of the output of the chaotic character evaluation processing 6504. The result of the deciphering operation as selected is displayed on the display apparatus 6507 via the output apparatus 6506 to be presented to the user.

Next, description will be directed to an embodiment of the invention in which the speed of the processing executed by the chaotic character calculating processing 3204 for evaluating the chaotic character of a time series signal can be increased.

Figure 35:
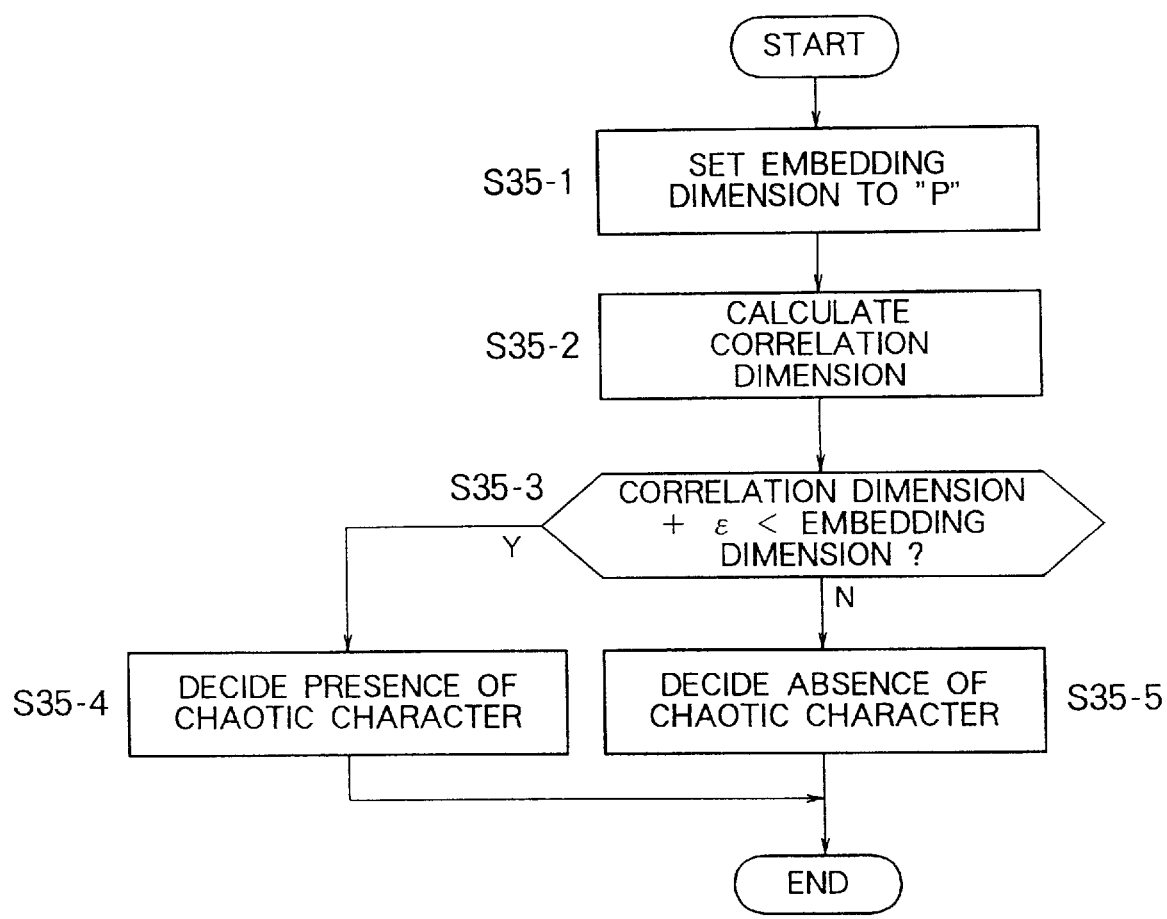
FIG. 35 is a flow chart for illustrating a chaotic character evaluation.

FIG. 35 shows a flow chart for illustrating the operation of the chaotic character calculation processing 3204 according to the instant embodiment. Referring to the figure, in step S35-1, an appropriate value P is set for the embedding dimension. In this conjunction, the value P may be selected greater than an expected value of the correlation dimension. By way of example, when the correlation dimension is expected to assume a value in the vicinity of "5", the value P may be set at a value around "10". In step S35-2, the correlation dimension is arithmetically determined by resorting to the procedure described hereinbefore by reference to FIG. 18. In step S35-3, it is decided whether or not a value obtained by adding an appropriate value $\epsilon$ to the correlation dimension is smaller than the embedding dimension. When the decision step S35-3 results in affirmation, presence of the chaotic character in the time series signal is determined in step S35-4. On the other hand, when the decision mentioned just above results in negation, absence of the chaotic character is determined in step S35-5, whereupon the processing comes to an end. The value $\epsilon$ used in the step S35-3 represents a constant for correcting an error involved in calculation of the correlation dimension and may be set in a range from "1" to "2". With the arrangement described above, the chaotic character evaluation processing can be realized at a higher speed when compared with the procedure in which the value of the embedding dimension is sequentially incremented one by one for detecting the saturation of the corresponding correlation dimension as described hereinbefore by reference to FIGS. 18 and 19.

Figure 36:
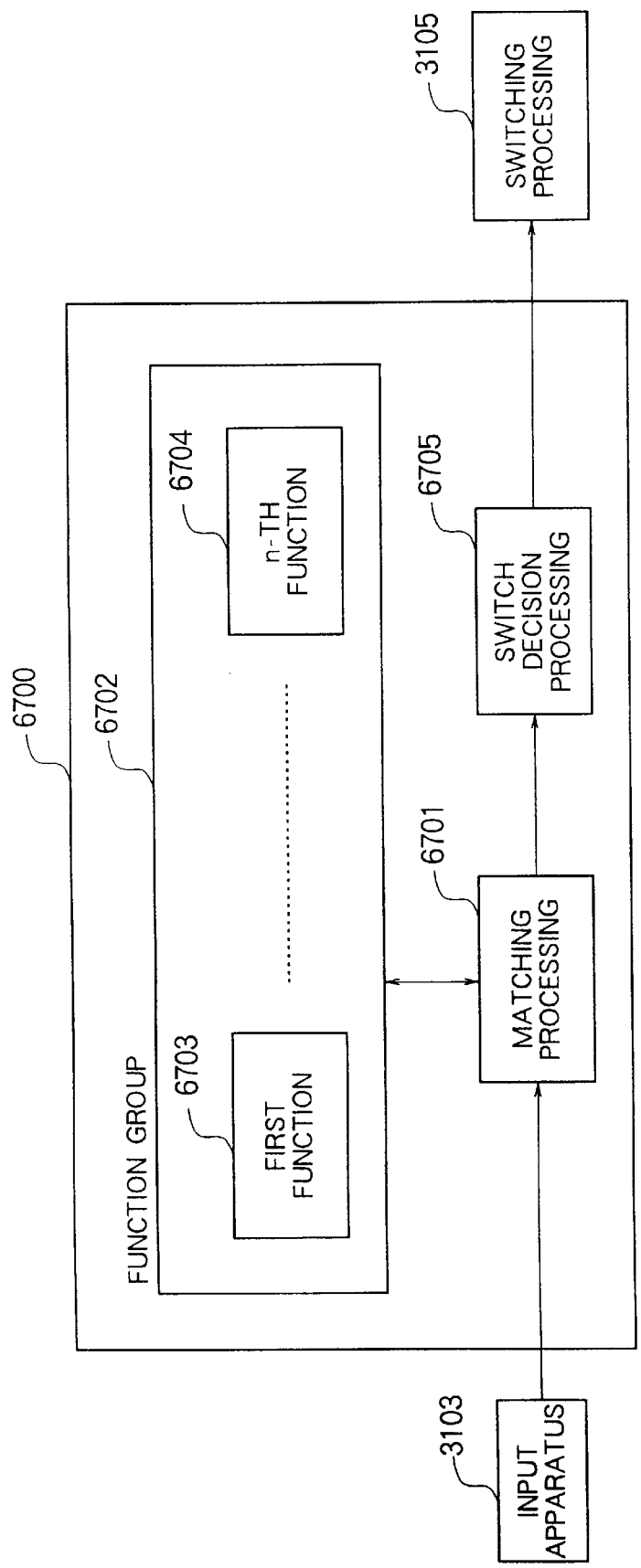
FIG. 36 is a diagram showing a configuration of a chaotic character decision processing.

FIG. 36 shows an embodiment of the invention according to which a chaos model is identified through the chaotic character evaluation processing 3104 for evaluating the chaotic character depending on the accuracy of identification. Referring to the figure, a chaotic character evaluation processing 6700 includes a matching processing 6701, a function group 6702 including a plurality of chaos functions, and a switch decision processing 6705. The function group 6702 includes a first function 6703 to an n-th function 6704 as the chaos functions. As the chaos functions, there may be employed logistic function or the like which may be expressed as follows:

$$\eta_t = a\eta_{t-1} \cdot (1-\eta_{t-1}) \quad (21)$$

For the time series signal inputted through the input apparatus 3103 which are given by $$(\xi_0, \xi_1, \xi_2, \ldots, \xi_t, \ldots, \xi_N) \quad (22)$$

the matching processing module 6701 calculates mutual correlations with time series signals which are generated from the initial value $\xi_0$ by the individual chaos functions in accordance with the expression (21) or the like and which are given by $$(\eta_0, \eta_1, \eta_2, \ldots, \eta_t, \ldots, \eta_N) \quad (23)$$

where $\eta_0 = \xi_0$

The degree of the mutual correlation can be calculated in accordance with $$U = (1/N) \sum_{t=0}^{N} (\eta_t - \xi_t)^2 \quad (24)$$

As the value of U is smaller, the mutual correlation increases. The chaos function for which the mutual correlation becomes greatest is extracted, and the value of U at that time is sent to the switch decision processing 6705, which responds thereto to decide that the time series signal fetched through the input apparatus 3103 can satisfactorily be identified with the chaos function and output a signal for causing the switching processing 3105 to be closed. By contrast, when the value U is large, it is decided that the time series signal as fetched suffers from no chaos, whereupon the signal for opening the switching processing 3105 is outputted. In this conjunction, it should be mentioned that when the value U is small, the disturbance prediction processing 3806 and the first prediction processing 4501 may be replaced by the chaotic functions given by the expression (21) or the like for calculating the predicted values, starting from the succeeding time point. Furthermore, when the invention is applied to the signal receiver apparatus 6500, similar processing may be adopted for processing the received signal superposed with the chaotic components, to thereby decipher the received enciphered signal by subtracting therefrom the chaos function as identified. In this manner, security of communication can be enhanced.

As is apparent from the foregoing, it is possible, according to the teachings of the invention in the illustrated embodiments described above, to determine with high reliability whether variation in the time series or sequential data is ascribable to chaos or noise by predicting variation in the given time series forwardly to the future and backwardly to the past and comparing the results with each other. Besides, when chaotic disturbance is superposed on the time series signal detected from the object under control, which may incur degradation in the control performance, it is possible to estimate the state of the object under control accurately by eliminating the chaotic disturbance to thereby reflect the estimated state to the control. In this way, the control can be realized with high accuracy.

Additionally, by providing the processings for evaluating the chaotic character of the time series signal and the switching processing, the control and the prediction can be optimized depending on the chaotic character of the time series signal. Thus, even for the object under control for which the chaotic character of the signal as detected is not uniform, the control and prediction performance can be enhanced.

Additionally, when the teachings of the invention is applied to the anti-abnormality processing system, it is possible to detect with high accuracy and reliability even the abnormality which could not heretofore be detected accurately, by virtue of establishment of correspondence between the degree of the chaotic character of the detected signal and the degrees of abnormality of the object of concern, whereby the most appropriate anti-abnormality processing can be selected for effectuating the appropriate anti-abnormality processing.

Furthermore, when the invention is applied to the deciphering apparatus, the most appropriate deciphering processing can autonomically be selected depending on the chaotic character of the data. Thus, the necessity for sending a deciphering key can be spared while ensuring high security for the ciphered communication. Furthermore, by sending the data while sequentially changing the chaos functions to be superposed, security of communication can further be enhanced.

Finally, it should also be mentioned that by speeding up the chaotic character decision processing, a range applicable to the control processing, the prediction processing, or the anti-abnormality processing which requires enhanced real-time performance is enlarged.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:
1. A processing apparatus incorporating a chaotic character detection function, comprising:
    chaotic character evaluation means for determining whether or not sequential data obtained from an object has chaotic characteristics,
        wherein the content of processing is determined on the basis of the result of the determination made by said chaotic character evaluation means;

embedding means for performing embedding processing on said sequential data;

embedded signal storage manes for storing embedded signals;

a prediction-dedicated database for storing each in a pair of outputs of said embedding means at given time points and outputs of said embedding means at succeeding time points corresponding to said given time points, respectively; and predicting means for predicting values of the sequential data appearing after said succeeding time points on the basis of said embedded signals and the content of said prediction dedicated database, wherein, depending on the result of the decision made by said chaotic character evaluation means on the basis of the data stored in said embedded signal storage means as to whether or not said sequential data has chaotic characteristics, the result of an arithmetic operation performed by said predicting means is reflected to the processing when said sequential data is of chaotic characteristics, while the result of the arithmetic operation performed by said predicting means is inhibited from being reflected to the processing when said sequential data has no chaotic characteristics.

2. A processing apparatus according to claim 1, wherein said chaotic characteristic evaluation means includes:

means for predicting variation in sequential data in the forward direction and means for determining a degree of accuracy of said prediction;

means for predicting variation of said sequential data in the reverse direction and means for determining a degree of accuracy of said prediction; and means for comparing said degrees of accuracy with each other, wherein when the degrees of said accuracy differ from each other, the variation of said sequential data is determined to be attributable to chaos, while when the degrees of said accuracy are substantially equal to each other, the variation in the sequential data is determined to be attributable to noise.

3. A processing apparatus according to claim 2, wherein both predictions by said means for predicting variation in the sequential data in the forward direction and means for predicting the variation in said sequential data in the reverse direction are executed by the same means.

4. A processing apparatus according to claim 1, wherein said chaotic characteristic evaluation means includes:

first prediction means for predicting variation in the forward direction and second prediction means for predicting variation in said sequential data in the reverse direction.

5. A processing apparatus according to claim 4, wherein both predictions by said means for predicting variation in the sequential data in the forward direction and means for predicting the variation in said sequential data in the reverse direction are executed by the same means.

6. A processing apparatus according to claim 1, wherein said chaotic characteristics evaluation means including:

first prediction means for predicting variation in the sequential data in a forward direction and second prediction means for predicting variation in said sequential data in the reverse direction by reversing said sequential data.

7. A processing apparatus according to claim 6, wherein both predictions by said means for predicting variation in the sequential data in the forward direction and means for predicting the variation in said sequential data in the reverse direction are executed by the same means.

8. A processing apparatus according to claim 1, wherein said chaotic characteristics evaluation means includes:

first prediction means for predicting variation in the sequential data in a forward direction and second prediction means for predicting variation in said sequential data in the reverse direction, wherein the predictions of the variation in the sequential data are performed through a plurality of predicting steps in the forward direction and in the reverse direction, respectively, and wherein when degrees of accuracy of both of said predictions differ from each other by a number of prediction steps which exceeds a predetermined ratio, a determination is made that the variation of said sequential data is attributable to chaos.

9. A processing apparatus according to claim 8, wherein both predictions by said means for predicting variation in the sequential data in the forward direction and means for predicting the variation in said sequential data in the reverse direction are executed by the same means.

10. A processing apparatus according to claim 1, wherein said chaotic characteristic evaluation means includes:

means for predicting variation in sequential data in the forward direction and means for determining a degree of accuracy of said prediction; and means for comparing said degrees of accuracy with a predetermined value, wherein when the degrees of accuracy are larger than the predetermined value, the variation of said sequential data is determined as being brought about by chaos, while when the degrees of accuracy are not substantially larger than the predetermined value, the variation in the sequential data is determined to be attributable to noise.

11. A processing apparatus according to claim 1, wherein said chaotic characteristics evaluation means includes:

means for calculating a value of a correlation dimension corresponding to a predetermined embedding dimension;

wherein when the correlation dimension is smaller than a predetermined value, the variation of said sequential data is determined to be attributable to chaos, while when the correlation dimension is not smaller than the predetermined value, the variation in the sequential data is determined to be attributable to noise.

12. A processing apparatus incorporating a chaotic characteristic detecting function, comprising:

chaotic characteristic evaluation means for determining whether or not sequential data obtained from an object has chaotic characteristics, wherein the content of processing is determined on the basis of the result of the determination made by said chaotic characteristic evaluation means, wherein said chaotic character evaluation means quantifies the degree of chaotic characteristics contained in the sequential data obtained from the object and determines the content of processing on the basis of the result of the quantification;

embedding means for performing embedding processing on said sequential data;

embedded signal storage means for storing embedded signals;

a prediction-dedicated database for storing each in a pair of outputs of said embedding means at given time points and outputs of said embedding means at succeeding time points corresponding to said given time points, respectively; and predicting means for predicting values of the sequential data appearing after said succeeding time points on the basis of said embedded signals and the content of said prediction-dedicated database, wherein depending on the result of the decision made by said chaotic characteristic evaluation means on the basis of the data stored in said embedded signal storage means as to the degree of chaotic characteristics of said sequential data, the degree at which the result of arithmetic operation performed by said predicting means is reflected to the processing is increased when said chaotic characteristic is significant, while the degree at which the result of the arithmetic operation performed by said predicting means is reflected to the processing is decreased when said chaotic characteristic is less significant.

13. A processing apparatus according to claim 12, wherein said chaotic characteristics evaluation means further includes:

means for predicting variation in the sequential data in the forward direction; and means for determining a degree of accuracy of said prediction, wherein the degree of chaotic characteristics is quantified by the degree of accuracy.

14. A processing apparatus according to claim 12, wherein said chaotic characteristics evaluation means includes:

means for calculating a value of a correlation dimension corresponding to a performed embedding dimension;

wherein the degree of chaotic characteristics is quantified by the value of the calculated correlation dimension.

15. A processing apparatus incorporating a chaotic characteristic detecting function for control apparatus of an object including a first control processing and a second control processing, comprising:

chaotic character evaluation means for determining whether or not sequential data obtained from an object has chaotic characteristics;

embedding means for performing embedding processing on said sequential data; and embedded signal storage means for storing embedded signals, wherein one of outputs of said two control processings is selected depending on the result of the determination made by said chaotic character evaluation means on the basis of the data stored in said embedded signal storage means as to whether or not said sequential data has chaotic characteristics.

16. A processing apparatus according to claim 15, wherein said chaotic characteristics evaluation means includes:

means for predicting variation in sequential data in the forward direction and means for determining a degree of accuracy of said prediction;

means for predicting variation of said sequential data in the reverse direction and means for determining a degree of accuracy of said prediction; and means for comparing said degrees of accuracy with each other, wherein when the degrees of accuracy differ from each other, the variation of said sequential data is determined to be attributable to chaos while when the degrees of said accuracy are substantially equal to each other, the variation in the sequential data is determined to be attributable to noise.

17. A processing apparatus according to claim 16, wherein both predictions by said means for predicting variation in the sequential data in the forward direction and means for predicting the variation in said sequential data in the reverse direction are executed by the same means.

18. A processing apparatus according to claim 15, wherein said chaotic characteristics evaluation means including:

first prediction means for predicting variation in the sequential data in the forward direction and second prediction means for predicting variation in said sequential data in the reverse direction.

19. A processing apparatus according to claim 18, wherein both predictions by said means for predicting variation in the sequential data in the forward direction and means for predicting the variation in said sequential data in the reverse direction are executed by the same means.

20. A processing apparatus according to claim 15, wherein said chaotic characteristics evaluation means includes:

first prediction means for predicting variation in the sequential data in the forward direction and second prediction means for predicting variation in said sequential data in the reverse direction by reversing said sequential data.

21. A processing apparatus according to claim 20, wherein both predictions by said means for predicting variation in the sequential data in the forward direction and means for predicting the variation in the said sequential data in the reverse direction are executed by the same means.

22. A processing apparatus according to claim 15, wherein said chaotic characteristics evaluation means includes:

first prediction means for predicting variation in the sequential data in the forward direction and second prediction means for predicting variation in said sequential data in the reverse direction, wherein the predictions of the variation in the sequential data are performed through a plurality of predicting steps in the forward direction and in the reverse direction, respectively, and wherein when degrees of accuracy of said both predictions differ from each other by a number of prediction steps which exceeds a predetermined ratio to said plurality of steps, a determination is made that the variation of said sequential data is attributable to chaos.

23. A processing apparatus according to claim 22, wherein both predictions by said means for predicting variation in the sequential data in the forward direction and means for predicting the variation in said sequential data in the reverse direction are executed by the same means.

24. A processing apparatus according to claim 15, wherein said chaotic characteristics evaluation means includes:

means for predicting variation in sequential data in the forward direction and means for determining a degree of accuracy of said prediction; and means for comparing said degree of accuracy with a predetermined value, wherein when the degree of said accuracy is larger than the predetermined value, the variation of said sequential data is determined to be attributable to chaos, while when the degree of said goodness is not substantially larger than the predetermined value, the variation in the sequential data is determined to be attributable to noise.

25. A processing apparatus according to claim 15, wherein said chaotic characteristics evaluation means includes:

means for calculating a value of a correlation dimension corresponding to a predetermined embedding dimension;

wherein when the correlation dimension is smaller than a predetermined value, the variation of said sequential data is determined to be attributable to chaos, while when the correlation dimension is not smaller than the predetermined value, the variation in the sequential data is determined to be attributable to noise.

26. A processing apparatus incorporating a chaotic characteristic detecting function for a control apparatus of an object including a first control processing and a second control processing, comprising:

chaotic characteristic evaluation means for determining whether or not sequential data obtained from an object has chaotic characteristics and for quantifying the degree of chaotic characteristics contained in the sequential data obtained from the object;

embedding means for performing embedding processing on said sequential data;

embedded signal storage means for storing embedded signals;

a prediction-dedicated database for storing outputs of said embedding means at given time points and outputs of said embedding means at succeeding time points corresponding to said given time points, respectively; and predicting means for predicting values of the sequential data appearing after said succeeding time points on the basis of said embedded signals and the content of said prediction-dedicated database, wherein, depending on the result of the determination made by said chaotic characteristic evaluation means on the basis of the data stored in said embedded signal storage means as to the degree of chaotic characteristics of said sequential data, one of outputs of said two control processings is modified by the output of the other control processing by the degree of chaotic characteristics.

27. A processing apparatus according to claim 26, wherein said chaotic characteristics evaluation means further includes:

means for predicting variation in the sequential data in the forward direction; and means for determining a degree of accuracy of said prediction, wherein the degree of chaotic characteristics is quantified by the degree of accuracy.

28. A processing apparatus according to claim 26, wherein said chaotic characteristics evaluation means includes:

means for calculating a value of a correlation dimension corresponding to a predetermined embedding dimension, wherein the degree of chaotic character is quantified by the value of the calculated correlation dimension.

29. A processing apparatus incorporating a chaotic character detecting function, comprising:

chaotic character evaluation means for deciding whether or not sequential data obtained from an object is of chaotic character, said chaotic character evaluating means comprising a function group containing a plurality of chaos functions and matching means, wherein said matching means determines a mutual correlation between sequential data obtained from said object and the chaos function approximating most fittingly said sequential data, and wherein said processing apparatus incorporating said chaotic character detecting function selects content of said processing on the basis of said mutual correlation; and means for determining the content of processing on the basis of the result of the decision made by said chaotic character evaluation means.

30. A processing apparatus incorporating a chaotic character detecting function as set forth in claim 29, wherein said chaotic character evaluation means quantifies the degree of chaotic character contained in the sequential data obtained from the object and determines the content of processing on the basis of the result of the quantification.

* * * * *